United States Patent
Tabata et al.

(10) Patent No.: US 11,487,092 B2
(45) Date of Patent: Nov. 1, 2022

(54) ZOOM LENS AND IMAGING DEVICE

(71) Applicant: TAMRON CO., LTD., Saitama (JP)

(72) Inventors: Hirofumi Tabata, Saitama (JP); Takahiro Mitsuhashi, Saitama (JP); Toshiya Segawa, Saitama (JP)

(73) Assignee: TAMRON CO., LTD., Saitama (JP)

( * ) Notice: Subject to any disclaimer, the term of this patent is extended or adjusted under 35 U.S.C. 154(b) by 166 days.

(21) Appl. No.: 16/992,512

(22) Filed: Aug. 13, 2020

(65) Prior Publication Data

US 2021/0199939 A1    Jul. 1, 2021

(30) Foreign Application Priority Data

Dec. 26, 2019 (JP) .............................. JP2019-235707

(51) Int. Cl.
    *G02B 15/14* (2006.01)
    *G02B 15/20* (2006.01)
    *G02B 27/00* (2006.01)

(52) U.S. Cl.
    CPC ............... *G02B 15/145113* (2019.08); *G02B 15/144113* (2019.08); *G02B 15/20* (2013.01); *G02B 27/0025* (2013.01)

(58) Field of Classification Search
    CPC ............ G02B 15/20; G02B 15/144113; G02B 15/145113; G02B 15/145129; G02B 15/1461; G02B 27/0025
    USPC ........................................................ 359/687
    See application file for complete search history.

(56) References Cited

U.S. PATENT DOCUMENTS

| | | | |
|---|---|---|---|
| 5,414,562 A * | 5/1995 | Ueda ..................... | G02B 15/173 359/683 |
| 2012/0154525 A1 | 6/2012 | Yoshinaga et al. | |
| 2012/0314298 A1* | 12/2012 | Ota ............... | G02B 15/145129 359/683 |
| 2013/0242184 A1* | 9/2013 | Matsumura .......... | G02B 13/001 359/683 |
| 2016/0004052 A1* | 1/2016 | Tomioka ................ | G02B 15/16 359/694 |
| 2016/0209627 A1* | 7/2016 | Seo ..................... | G02B 27/0025 |
| 2016/0231544 A1* | 8/2016 | Hayakawa ..... | G02B 15/144113 |
| 2018/0239117 A1* | 8/2018 | Lee ..................... | G02B 27/0025 |
| 2020/0341249 A1* | 10/2020 | Ito ........................... | G02B 7/09 |

FOREIGN PATENT DOCUMENTS

| | | |
|---|---|---|
| JP | 2013-105142 A | 5/2013 |
| JP | 2015-087626 A | 5/2015 |
| WO | WO 2011/099250 A1 | 8/2011 |

* cited by examiner

*Primary Examiner* — Kristina M Deherrera
(74) *Attorney, Agent, or Firm* — Paratus Law Group, PLLC

(57) ABSTRACT

A zoom lens includes, in order from an object side, a first lens group that is positive, a second lens group that is negative, a third lens group that is positive, and a fourth lens group that is positive. During zooming from a wide angle end to a telephoto end, at least the first lens group and the third lens group are fixed and an interval on an optical axis of an adjacent lens group relative thereto is changed. In the zoom lens, the fourth lens group includes at least one positive lens and satisfies a predetermined conditional expression. In addition, an imaging device includes the zoom lens and an image sensor.

14 Claims, 21 Drawing Sheets

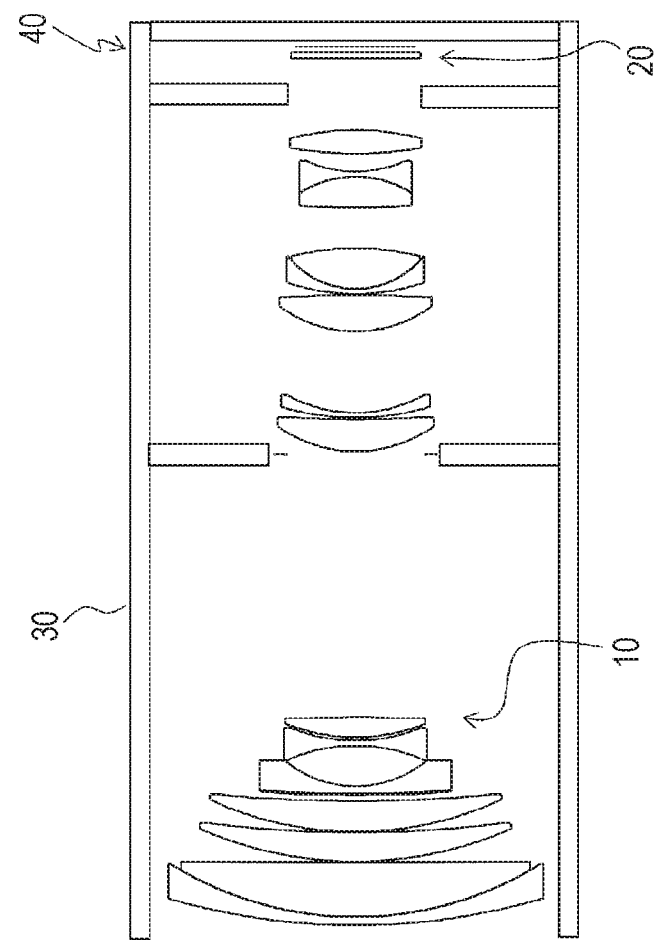

ZOOM LENS AND IMAGING DEVICE

CROSS-REFERENCE TO RELATED APPLICATIONS

This application is based on and claims the benefit of priority from Japanese Patent Application No. 2019-235707, filed on Dec. 26, 2019, the entire contents of which are incorporated herein by reference.

BACKGROUND OF THE INVENTION

Technical Field

The present invention relates to a zoom lens and an imaging device, particularly to a zoom lens suitable for an imaging device such as a digital still camera or a digital video camera using a solid-state image sensor (CCD, CMOS, or the like) and an imaging device.

Related Art

In the related art, in various imaging devices such as a surveillance camera, a video camera, a digital still camera, a single lens reflex camera, and a mirrorless camera using a solid-state image sensor, a zoom lens capable of changing a focal length is widely used as an imaging optical system. Along with a reduction in size of the imaging devices, a reduction in size of the zoom lens is also required. In addition, with an increase in number of pixels and an improvement in sensitivity of the solid-state image sensor, there is required a zoom lens that exhibits high resolution and is bright over the entire zoom range.

As such a zoom lens, for example, WO 2011/099250 A discloses a zoom lens including a first lens group having positive refractive power, a second lens group having negative refractive power, a third lens group having negative refractive power, and a fourth lens group having positive refractive power.

In addition, JP 2015-087626 A discloses a zoom lens including a first lens group having positive refractive power, a second lens group having negative refractive power, a third lens group having positive refractive power, and a rear group.

Further, JP 2013-105142 A discloses a zoom lens including a first lens group having positive refractive power, a second lens group having negative refractive power, a third lens group having positive refractive power, a fourth lens group having negative refractive power, and a fifth lens group having positive refractive power.

SUMMARY OF THE INVENTION

By the way, with progress in image recognition technique in the recent years, there is required a zoom lens in which aberration is corrected over a wide wavelength range to exhibit higher optical performance and thus images can be captured regardless of day and night, namely, regardless of ambient brightness. However, in the zoom lens of the related art, the correction of chromatic aberration over a wide wavelength range is insufficient, and thus it is required to implement higher optical performance.

The invention is made in light of the above problem, and provides a zoom lens and an imaging device capable of favorably correcting chromatic aberration to obtain high optical performance.

According to an aspect of the invention, in order to solve the above problem, there is provided a zoom lens including, in order from an object side: a first lens group having positive refractive power; a second lens group having negative refractive power; a third lens group having positive refractive power; and a fourth lens group having positive refractive power. During zooming from a wide angle end to a telephoto end, at least the first lens group and the third lens group are fixed and an interval on an optical axis of an adjacent lens group relative thereto is changed, and the fourth lens group includes at least one positive lens P and satisfies conditional expression (1), conditional expression (2), conditional expression (3), and conditional expression (4) listed below:

$$1.5 \leq f4/fw \leq 4.5 \tag{1}$$

$$1.0 < f4p/f4 < 5.8 \tag{2}$$

$$0.01 \leq \Delta PgF\_4p \leq 0.05 \tag{3}$$

$$-0.2 \leq \Delta PCt\_4p \leq -0.03 \tag{4}$$

where fw is a focal length of the zoom lens during infinity focusing at the wide angle end, f4 is a focal length of the fourth lens group, f4p is a focal length of the positive lens P, $\Delta PgF\_4p$ is extraordinary dispersion for a g line and an F line of the positive lens P, and $\Delta PCt\_4p$ is extraordinary dispersion for a C line and a t line of the positive lens P.

In addition, according to another aspect of the invention, in order to solve the above problem, there is provided an imaging device including: the zoom lens; and an image sensor configured to convert an optical image, which is formed by the zoom lens, into an electric signal.

According to the invention, it is possible to provide a zoom lens and an imaging device capable of favorably correcting chromatic aberration to obtain high optical performance.

BRIEF DESCRIPTION OF THE DRAWINGS

FIG. 21 is a cross-sectional view schematically illustrating one example of an imaging device of the invention.

DESCRIPTION OF THE EMBODIMENTS

Figure 1:
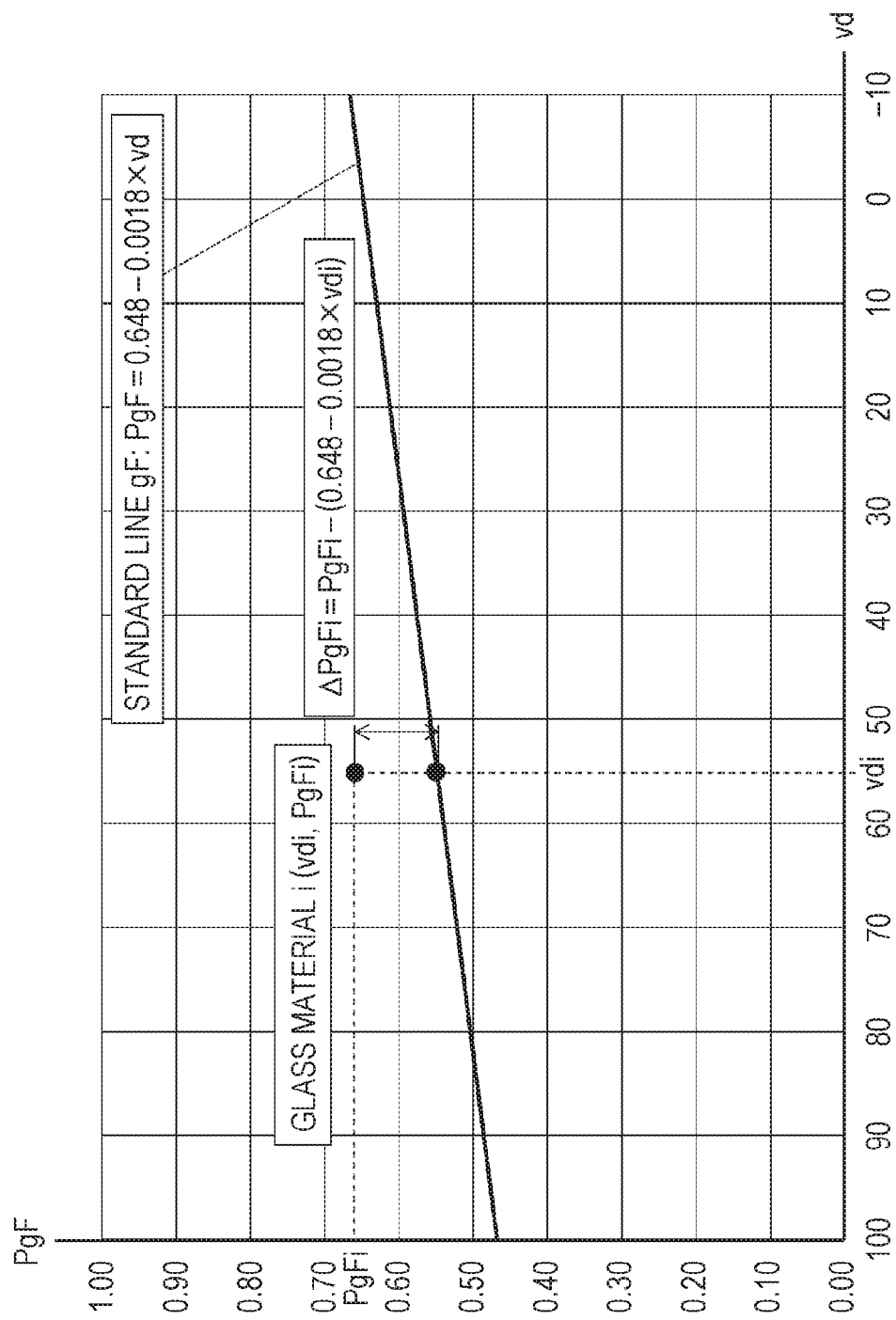
FIG. 1 is a graph for describing extraordinary dispersion $\Delta PgF$.

Hereinafter, embodiments of a zoom lens and an imaging device according to the invention will be described. However, a zoom lens and an imaging device to be described below are one mode of the zoom lens and the imaging device according to the invention, and the zoom lens and the imaging device according to the invention are not limited to the following mode.

1. Zoom Lens 1-1. Optical Configuration

The zoom lens includes, in order from an object side, a first lens group having positive refractive power, a second lens group having negative refractive power, a third lens group having positive refractive power, and a fourth lens group having positive refractive power. During zooming from a wide angle end to a telephoto end, at least the first lens group and the third lens group are fixed and the interval on the optical axis of an adjacent lens group relative thereto is changed. In the zoom lens, the fourth lens group includes at least one positive lens P having extraordinary dispersion. Since such a configuration is adopted, the zoom lens can favorably correct chromatic aberration over a wide wavelength range, and it is possible to obtain a compact zoom lens having high optical performance.

In addition, when the first lens group is fixed in an optical axis direction during zooming, the total length of the zoom lens is not changed during zooming. For this reason, it is possible to simplify the configuration of a barrel. In comparison to a telescopic barrel structure, a movable portion is reduced, and thus it is easy to realize a highly robust barrel structure and it is also easy to adopt a dust-proof and drip-proof structure. In addition, since the third lens group is fixed in the optical axis direction, it is possible to reduce the size and the weight of a zooming drive system accommodated in the barrel and it is also possible to secure a sufficient space to accommodate a focus drive system; and thereby, configuration in the barrel can be simplified.

In the zoom lens, except the above points, other configurations and the like are not particularly limited; however, it is preferable that for example, the following configuration is adopted.

(1) First Lens Group

The first lens group may include one positive lens; however, it is preferable that the first lens group also includes a negative lens. In addition, it is preferable that the first lens group includes a plurality of positive lenses.

(2) Second Lens Group

The second lens group may include one negative lens; however, it is preferable that the second lens group also includes a positive lens. In particular, it is preferable that the second lens group includes at least two negative lenses and at least one positive lens. Since the second lens group is configured as described above, it is possible to favorably correct various aberrations that fluctuate during zooming. In order to obtain the above effect, it is further preferable that the second lens group includes, in order from the object side, a negative meniscus lens, a biconcave lens, and a positive lens.

(3) Third Lens Group

The third lens group may include one positive lens; however, it is preferable that the third lens group also includes a negative lens. In particular, it is preferable that the third lens group includes, in order from the object side, a positive lens and a negative lens. Since the third lens group includes, in order from the object side as described above, a positive lens and a negative lens, it is possible to favorably correct spherical aberration, axial chromatic aberration, and field curvature.

(4) Fourth Lens Group

As long as the fourth lens group includes at least one positive lens P having positive refractive power and extraordinary dispersion, a specific lens configuration of the fourth lens group is not particularly limited. For example, the fourth lens group may include only one positive lens P; however, the fourth lens group may include another positive lens or negative lens. Further, the fourth lens group may include a plurality of the positive lenses P. As described above, the lens configuration is not particularly limited, and as a preferable configuration, for example, in the fourth lens group, the positive lens P is disposed closest to the object side and the positive lens P is a plastic lens. Since such a configuration is adopted, it is possible to suppress an increase in cost required to produce the zoom lens while favorably correcting various aberrations. From the viewpoint of more favorably correcting various aberrations, it is preferable that for example, the fourth lens group includes a positive lens and a doublet lens made up of a negative lens and a positive lens and a positive lens disposed closest to the object side is the positive lens P which is a plastic lens. In this case, it is further preferable that one surface or both surfaces of the positive lens P is aspherical surfaces.

(5) Fifth Lens Group

It is preferable that the zoom lens includes the first lens group to the fourth lens group, and the fifth lens group is not an indispensable configuration. However, since one or more lens groups having positive or negative refractive power are disposed on an image side of the fourth lens group, the degree of freedom in aberration correction is increased, and thus it is possible to more favorably correct various aberrations over the entire zoom range.

In a case where the fifth lens group is disposed on the image side of the fourth lens group, the refractive power of the fifth lens group may be positive or negative; however, it is more preferable that the fifth lens group has negative refractive power. Since the fifth lens group having negative refractive power is disposed on the image side of the fourth lens group, it is possible to more favorably correct spherical aberration and field curvature occurring in the first lens group to the fourth lens group.

In addition, the zoom lens may include a sixth lens group that is positive or negative. As long as the number of lens groups forming the zoom lens is 4 or larger, the number of lens groups forming the zoom lens is not limited. However, in order to reduce the size of the zoom lens, it is preferable that the number of lens groups actually forming the zoom lens is 7 or less or 6 or less.

(6) Aperture Stop

The position of an aperture stop in the zoom lens is not particularly limited. However, in the zoom lens, at least the first lens group and the third lens group are fixed in the optical axis direction during zooming. For this reason, it is preferable that the aperture stop is disposed between the second lens group and the fourth lens group and together with the third lens group which is a fixed group, the aperture stop is fixed during zooming from the wide angle end to the telephoto end and during focusing from infinity to near. As described above, in a case where the aperture stop is disposed around the third lens group that is a fixed group, a drive mechanism that opens and closes the aperture stop can be disposed around the fixed group. In a case where the aperture stop is disposed around the fixed group, since a mechanism that moves the fixed group during zooming is not required to be accommodated in the barrel, a space that accommodates the drive mechanism opening and closing the aperture stop can be easily secured in the barrel, and it is possible to reduce the overall size of the zoom lens including the barrel. Further, since the diameter of a pencil of light is reduced between the second lens group and the fourth lens group, it is possible to dispose a compact aperture stop, and it is possible to reduce the size and the weight of the aperture stop and the drive mechanism that opens and closes the aperture stop.

(7) Focusing Group

It is preferable that during focusing from infinity to near, the fifth lens group becomes a focusing group and the fifth lens group is moved on the optical axis. In a case where the zoom lens includes the second lens group that is negative and the fifth lens group that is negative, it is preferable that during focusing from infinity to near, the fifth lens group or the second lens group becomes a focusing group and the fifth lens group or the second lens group is moved on the optical axis.

Since during focusing from infinity to near, the fifth lens group or the second lens group is moved on the optical axis, it is possible to reduce an aberration fluctuation occurring during focusing.

1-3. Conditional Expression

The zoom lens satisfies the following conditional expressions or it is preferable that the zoom lens satisfies the following conditional expressions. Here, a positive lens having extraordinary dispersion refers to a positive lens satisfying conditional expression (3) and conditional expression (4) to be described below. The positive lens P is a lens that also satisfies conditional expression (2) in addition to conditional expression (3) and conditional expression (4). Hereinafter, the conditional expressions will be described sequentially from conditional expression (1).

1-3-1. Conditional Expression (1)

$$1.5 \leq f4/fw \leq 4.5$$

where fw is the focal length of the zoom lens during infinity focusing at the wide angle end, and f4 is the focal length of the fourth lens group.

Conditional expression (1) is an expression defining the ratio between the focal length of the zoom lens during infinity focusing at the wide angle end and the focal length of the fourth lens group. When conditional expression (1) is satisfied, it is possible to set the focal length of the fourth lens group at the wide angle end within an appropriate range, and it is possible to appropriately correct spherical aberration, astigmatism, and field curvature occurring in the fourth lens group.

Meanwhile, when the value of conditional expression (1) is less than a lower limit value, the focal length of the fourth lens group at the wide angle end becomes too short, and thus the spherical aberration, the astigmatism, or the field curvature is increased. Therefore, it is difficult to obtain favorable optical performance. On the other hand, when the value of conditional expression (1) is larger than an upper limit value, the focal length of the fourth lens group at the wide angle end becomes too long, and thus the spherical aberration, the astigmatism, or the field curvature is insufficiently corrected. Therefore, it is difficult to reduce the size of the zoom lens.

In order to obtain the above effect, the lower limit value of conditional expression (1) is more preferably 1.6 and further preferably 1.7. In addition, the upper limit value of conditional expression (1) is more preferably 3.5 and further preferably 3.0. Incidentally, in a case where the preferable lower limit value or the preferable upper limit value is adopted, the unstrict inequality sign ($\leq$) may be replaced with the inequality sign ($<$) in conditional expression (1). In principle, the same applies to the other conditional expressions.

1-3-2. Conditional Expression (2)

$$1.0 < f4p/f4 < 5.8$$

where f4p is the focal length of the positive lens P.

Conditional expression (2) is an expression defining the ratio between the focal length of the positive lens P disposed in the fourth lens group and the focal length of the fourth lens group. The fourth lens group includes at least one positive lens P. When conditional expression (2) is satisfied, it is possible to set the focal length of the positive lens P within an appropriate range, and it is possible to appropriately correct spherical aberration, comatic aberration, and field curvature occurring in the fourth lens group.

Meanwhile, when the value of conditional expression (2) is less than a lower limit value, the focal length of the positive lens P becomes too short, and thus the spherical aberration, the comatic aberration, and the field curvature are excessively corrected. Therefore, it is difficult to obtain favorable optical performance. On the other hand, when the value of conditional expression (2) is larger than an upper limit value, the focal length of the positive lens P becomes too long, and thus the spherical aberration, the comatic aberration, and the field curvature are insufficiently corrected, and it is difficult to reduce the size of the optical system.

In order to obtain the above effect, the lower limit value of conditional expression (2) is more preferably 1.05 and further preferably 1.08. In addition, the upper limit value of conditional expression (2) is more preferably 5.5 and further preferably 5.0. In a case where the preferable lower limit value or the preferable upper limit value is adopted in conditional expression (2), the inequality sign (<) may be replaced with the unstrict inequality sign (≤) in conditional expression (2).

1-3-3. Conditional Expression (3)

$$0.01 \leq \Delta PgF\_4p \leq 0.05$$

where $\Delta PgF\_4p$ is extraordinary dispersion for the g line and the F line of the positive lens P.

Conditional expression (3) is an expression defining extraordinary dispersion for the g line and the F line of the positive lens P. When conditional expression (3) is satisfied, it is possible to favorably correct axial chromatic aberration and magnification chromatic aberration in the visual light region from the g line to the F line in the fourth lens group.

Here, the extraordinary dispersion for the g line and the F line of a lens (glass material) will be described. First, when spectral lines and the wavelengths of the spectral lines are a t line (1013.98 mm), a C line (656.27 nm), a d line (587.56 nm), an F line (486.13 nm), and a g line (435.84 nm) and random letters x and y are caused to correspond to the spectral lines, the refractive indexes for the x line and the y line are defined as nx and ny. For example, the refractive index for the d line is nd and the refractive index for the F line is nF. Further, the partial dispersion ratio for the x line and the y line is Pxy, and Pxy is defined as (nx−ny)/(nF−nC). For example, a partial dispersion ratio PgF for the g line and the F line is (ng−nF)/(nF−nC) and a partial dispersion ratio PCt for the C line and the t line is (nC−nt)/(nF−nC).

Next, the extraordinary dispersion for the g line and the F line will be specifically described. FIG. 1 is a graph for describing the extraordinary dispersion for the g line and the F line. As illustrated in FIG. 1, first, an X-axis is an Abbe number vd for the d line and a Y-axis is the partial dispersion ratio PgF for the g line and the F line on an X-Y coordinate plane. Then, two points on the coordinate plane are determined for the g line and the F line in two reference glass materials, and a straight line connecting the two points is defined as a standard line gF for the g line and the F line. In the invention, the standard line gF is defined as "PgF=0.648−0.0018×vd" which is a straight line having a slope of −0.0018 and an intercept of 0.648. Accordingly, regarding the extraordinary dispersion for the g line and the F line, a deviation ΔPgF of PgF from the standard line gF with respect to vd of the given glass material can be defined as the value of the extraordinary dispersion. For example, when the Abbe number for the d line of a random glass material i is vdi and the partial dispersion ratio for the g line and the F line is PgFi, the extraordinary dispersion ΔPgFi for the g line and the F line of the random glass material i can be calculated as PgFi−(0.648−0.0018×vdi). ΔPgF defined as described above represents the extraordinary dispersion for the g line and the F line. The extraordinary dispersion of at least one positive lens disposed in the fourth lens group can be obtained as described above based on the Abbe number of the glass material of the positive lens.

Meanwhile, when the value of conditional expression (3) is less than a lower limit value, the extraordinary dispersion of the positive lens included in the fourth lens group becomes too small, and thus chromatic aberration in a wavelength range including the F line is increased. Therefore, it is difficult to obtain favorable optical performance for light in a wavelength range from the g line to the F line. On the other hand, when the value of conditional expression (3) is larger than an upper limit value, the extraordinary dispersion of the positive lens included in the fourth lens group becomes too large, and thus chromatic aberration in the wavelength range including the F line is excessively corrected. Therefore, it is difficult to obtain favorable optical performance for light in the wavelength range from the g line to the F line.

In order to obtain the above effect, the lower limit value of conditional expression (3) is more preferably 0.012 and further preferably 0.014. In addition, the upper limit value of conditional expression (3) is more preferably 0.04 and further preferably 0.03.

1-3-4. Conditional Expression (4)

$$-0.2 \leq \Delta PCt\_4p \leq -0.03$$

where $\Delta PCt\_4p$ is extraordinary dispersion for the C line and the t line of the positive lens P.

Conditional expression (4) is an expression defining extraordinary dispersion for the C line and the t line of at least one positive lens disposed in the fourth lens group. When conditional expression (4) is satisfied, it is possible to correct axial chromatic aberration and magnification chromatic aberration in the near infrared region from the C line to the t line in the fourth lens group.

Figure 2:
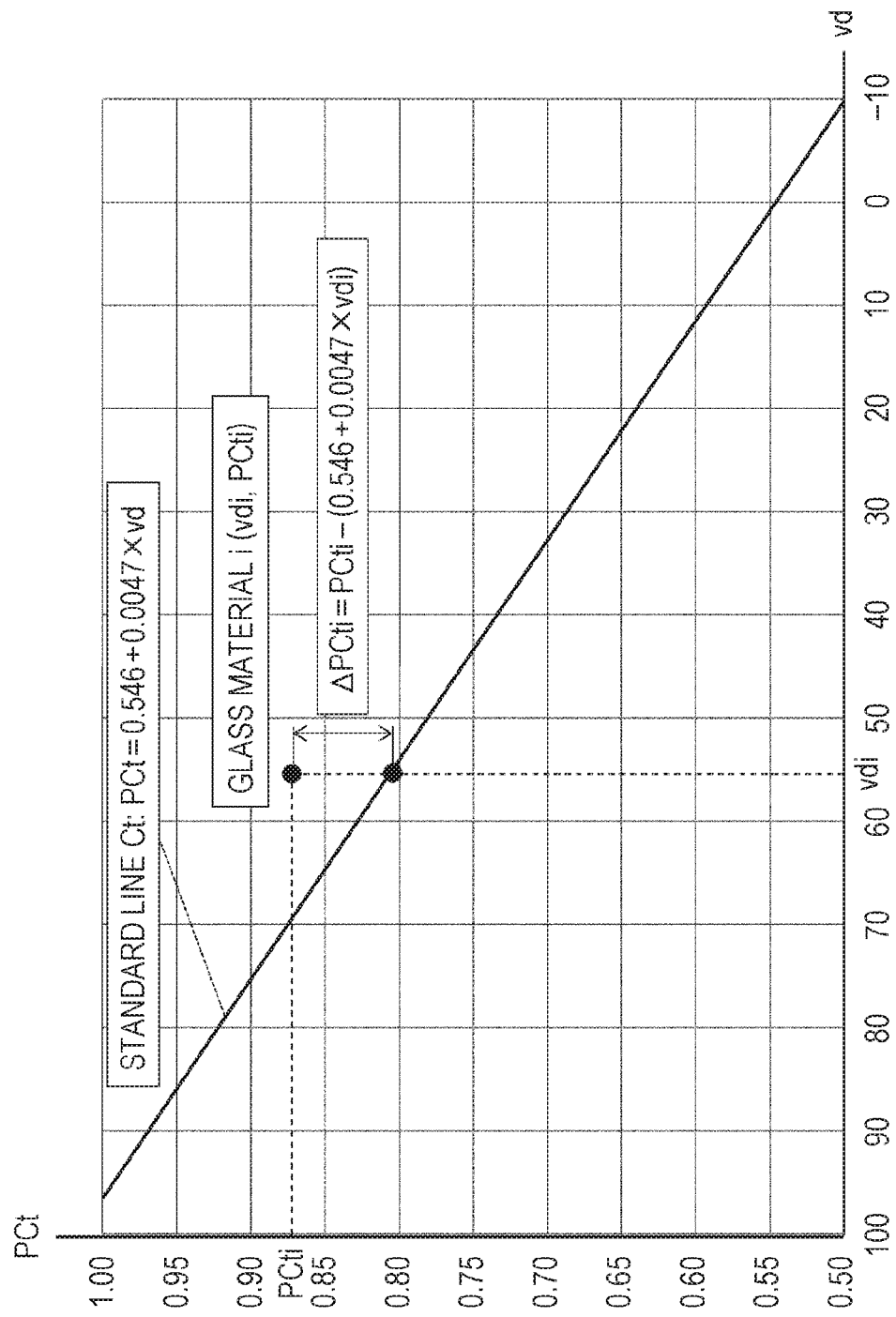
FIG. 2 is a graph for describing extraordinary dispersion $\Delta PCt$.

Here, the extraordinary dispersion for the C line and the t line will be specifically described. The extraordinary dispersion for the C line and the t line can be also defined in the same way as the extraordinary dispersion for the g line and the F line. FIG. 2 is a graph for describing the extraordinary dispersion for the C line and the t line. As illustrated in FIG. 2, first, an X-axis is the Abbe number vd for the d line and a Y-axis is the partial dispersion ratio PCt for the C line and the t line on an X-Y coordinate plane. Then, two points on the coordinate plane are determined for the C line and the t line in two reference glass materials, and a straight line connecting the two points is defined as a standard line Ct for the C line and the t line. In the invention, the standard line Ct is defined as "PCt=0.546+0.0047×vd" which is a straight line having a slope of 0.0047 and an intercept of 0.546. Accordingly, regarding the extraordinary dispersion for the C line and the t line, a deviation ΔPCt of PCt from the standard line Ct with respect to vd of the given glass material can be defined as the value of the extraordinary dispersion. For example, when the Abbe number for the d line of the random glass material i is vdi and the partial dispersion ratio for the C line and the t line is PCti, the extraordinary dispersion ΔPCti for the C line and the t line of the random glass material i can be calculated as PCti−(0.546+0.0047×vdi). ΔPCt defined as described above represents the extraordinary dispersion for the C line and the t line. The extraordinary dispersion of at least one positive lens disposed in the fourth lens group can be obtained as described above based on the Abbe number of the glass material of the positive lens.

Meanwhile, when the value of conditional expression (4) is less than a lower limit value, the extraordinary dispersion of the positive lens included in the fourth lens group becomes too small, and thus chromatic aberration in the near infrared region including the t line is increased. Therefore, it is difficult to obtain favorable optical performance for light in a wavelength range including the near infrared region. On the other hand, when the value of conditional expression (4) is larger than an upper limit value, the extraordinary dispersion of the positive lens included in the fourth lens group becomes too large, and thus aberration in the near infrared region including the t line is excessively corrected. Therefore, it is difficult to obtain favorable optical performance for light in the wavelength range including the near infrared region.

In order to obtain the above effect, the lower limit value of conditional expression (4) is more preferably −0.15 and further preferably −0.10. In addition, the upper limit value of conditional expression (4) is more preferably −0.04 and further preferably −0.05.

Here, as described above, the positive lens P refers to a positive lens satisfying conditional expression (2), conditional expression (3), and conditional expression (4), and the fourth lens group may include at least one positive lens P. In other words, in a case where the fourth lens group includes a plurality of positive lenses, at least one of the positive lenses may be the positive lens P. In addition, it is preferable that the positive lens P is a plastic lens. Since the positive lens P is a plastic lens, it is possible to obtain a zoom lens having favorable performance while suppressing an increase in cost.

1-3-5. Conditional Expression (5)

$$3.6 \leq f3/fw \leq 12.0$$

where
f3 is the focal length of the third lens group.

Conditional expression (5) is an expression defining the ratio between the focal length of the entire system during infinity focusing at the wide angle end, the focal length of the third lens group, and the focal length of the zoom lens during infinity focusing at the wide angle end. When conditional expression (5) is satisfied, it is possible to set the refractive power of the third lens group at the wide angle end within an appropriate range, and it is possible to obtain a bright zoom lens.

Meanwhile, when the value of conditional expression (5) is less than a lower limit value, the focal length of the third lens group becomes too short, and thus spherical aberration and field curvature are excessively corrected. Therefore, it is difficult to obtain favorable optical performance. On the other hand, when the value of conditional expression (5) is larger than an upper limit value, the focal length of the third lens group becomes too long, and thus spherical aberration and field curvature are insufficiently corrected, and it is difficult to reduce the size of the zoom lens.

In order to obtain the above effect, the lower limit value of conditional expression (5) is more preferably 3.8 and further preferably 4.0. In addition, the upper limit value of conditional expression (5) is more preferably 10.0 and further preferably 8.5.

1-3-6. Conditional Expression (6)

$$1.5 \leq nd3n$$

where
nd3n is a refractive index for the d line of the negative lens included in the third lens group.

Conditional expression (6) is an expression defining a lower limit of the refractive index of the negative lens included in the third lens group. When conditional expression (6) is satisfied, it is possible to reduce spherical aberration and field curvature occurring in the negative lens. Meanwhile, when conditional expression (6) is less than the lower limit, the curvature of the negative lens is increased, and thus the spherical aberration and the field curvature are increased. Therefore, it is difficult to obtain a zoom lens having favorable optical performance.

In order to obtain the above effect, the lower limit value of conditional expression (6) is more preferably 1.7 and further preferably 1.8.

1-3-7. Conditional Expression (7)

$$vd3n \leq 50.0$$

where
vd3n is an Abbe number for the d line of the negative lens included in the third lens group.

Conditional expression (7) is an expression defining an upper limit of the Abbe number of the negative lens included in the third lens group. When conditional expression (7) is satisfied, it is possible to appropriately correct axial chromatic aberration and magnification chromatic aberration occurring in the third lens group; and thereby, a favorable optical system can be obtained. Meanwhile, when the value of conditional expression (7) is larger than an upper limit value, the dispersion of the negative lens is reduced, and thus it is difficult to correct the axial chromatic aberration and the magnification chromatic aberration occurring in the third lens group.

In order to obtain the above effect, the upper limit value of conditional expression (7) is more preferably 45.0 and further preferably 41.0.

1-3-8. Conditional Expression (8)

$$55 \leq vd4\_ave$$

where
vd4_ave is an average value of Abbe numbers for the d line of all the positive lenses included in the fourth lens group.

Conditional expression (8) is an expression defining a lower limit of the average value of the Abbe numbers of all the positive lenses included in the fourth lens group. When conditional expression (8) is satisfied, it is possible to favorably correct axial chromatic aberration and magnification chromatic aberration in the fourth lens group. Meanwhile, when the value of conditional expression (8) is less than a lower limit value, the axial chromatic aberration and the magnification chromatic aberration occurring in the fourth lens group are increased, and thus it is difficult to obtain a zoom lens having favorable optical performance.

In order to obtain the above effect, the lower limit value of conditional expression (8) is more preferably 58 and further preferably 60.

1-3-9. Conditional Expression (9)

$$0.05 \leq f4/ft \leq 1.0$$

Conditional expression (9) is an expression defining the ratio between the focal length of the zoom lens during infinity focusing at the telephoto end and the focal length of the fourth lens group. When conditional expression (9) is satisfied, it is possible to set the focal length of the fourth lens group at the telephoto end within an appropriate range, and it is possible to favorably correct spherical aberration, astigmatism, and field curvature occurring at the telephoto end.

Meanwhile, when the value of conditional expression (9) is less than a lower limit value, the focal length of the fourth lens group becomes too short, and thus spherical aberration, astigmatism, or field curvature is excessively corrected. Therefore, it is difficult to obtain a zoom lens having favorable optical performance. On the other hand, when the value of conditional expression (9) is larger than an upper limit value, the focal length of the fourth lens group becomes too long, and thus spherical aberration, astigmatism, or field curvature is insufficiently corrected. Therefore, it is difficult to obtain a zoom lens having favorable optical performance. In addition, in this case, since the distance on the optical axis between the lens surface disposed closest to the image side and an image sensor becomes long, it is difficult to reduce the size of the zoom lens.

In order to obtain the above effect, the lower limit value of conditional expression (9) is more preferably 0.08 and further preferably 0.09. In addition, the upper limit value of conditional expression (9) is more preferably 0.8 and further preferably 0.7.

1-3-10. Conditional Expression (10)

$$1.5 \leq f4p/fw \leq 12.0$$

Conditional expression (10) is an expression defining the ratio between the focal length of the zoom lens during infinity focusing at the wide angle end and the focal length of at least one positive lens disposed in the fourth lens group. When conditional expression (10) is satisfied, it is possible to favorably correct spherical aberration, comatic aberration, and field curvature at the wide angle end.

Meanwhile, when the value of conditional expression (10) is less than a lower limit value, the focal length of the positive lens disposed in the fourth lens group becomes too short, and thus spherical aberration, comatic aberration, and field curvature at the wide angle end are excessively corrected. Therefore, it is difficult to obtain a zoom lens having favorable optical performance. On the other hand, when the value of conditional expression (10) is larger than an upper limit value, the focal length of the positive lens disposed in the fourth lens group becomes too long, and thus spherical aberration, comatic aberration, and field curvature at the wide angle end are insufficiently corrected. Therefore, it is difficult to obtain a zoom lens having favorable optical performance.

In order to obtain the above effect, the lower limit value of conditional expression (10) is more preferably 1.7 and further preferably 2.0. In addition, the upper limit value of conditional expression (10) is more preferably 11.0 and further preferably 10.0.

1-3-11. Conditional Expression (11)

$$0.05 \leq f4p/ft \leq 1.1$$

where ft is the focal length of the zoom lens during infinity focusing at the telephoto end.

Conditional expression (11) is an expression defining the ratio between the focal length of at least one positive lens disposed in the fourth lens group and the focal length of the zoom lens during infinity focusing at the telephoto end. When conditional expression (11) is satisfied, it is possible to favorably correct spherical aberration, comatic aberration, and field curvature at the telephoto end.

Meanwhile, when the value of conditional expression (11) is less than a lower limit value, the focal length of the positive lens disposed in the fourth lens group becomes too short, and thus spherical aberration, comatic aberration, and field curvature at the telephoto end are excessively corrected. Therefore, it is difficult to obtain a zoom lens having favorable optical performance. On the other hand, when the value of conditional expression (11) is larger than an upper limit value, the focal length of the positive lens disposed in the fourth lens group becomes too long, and thus spherical aberration, comatic aberration, and field curvature at the telephoto end are insufficiently corrected. Therefore, it is difficult to obtain a zoom lens having favorable optical performance. In addition, when the focal length of the positive lens becomes long, the focal length of the fourth lens group also becomes long, and thus the total optical length of the zoom lens becomes long. Therefore, it is difficult to reduce the size of the zoom lens.

In order to obtain the above effect, the lower limit value of conditional expression (11) is more preferably 0.08 and further preferably 0.1. In addition, the upper limit value of conditional expression (11) is more preferably 1.0 and further preferably 0.9.

1-3-12. Conditional Expression (12)

$$0.25 \leq f3/f1 \leq 2.2$$

where f1 is the focal length of the first lens group, and f3 is the focal length of the third lens group.

Conditional expression (12) is an expression defining the ratio between the focal length of the third lens group and the focal length of the first lens group. When conditional expression (12) is satisfied, the focal length of the third lens group is within an appropriate range, and thus it is possible to favorably correct spherical aberration at the telephoto end and to obtain a compact zoom lens having high optical performance.

Meanwhile, when the value of conditional expression (12) is less than a lower limit value, the focal length of the third lens group becomes too short, and thus spherical aberration is excessively corrected. Therefore, it is difficult to obtain a zoom lens having favorable optical performance. On the other hand, when the value of conditional expression (12) is larger than an upper limit value, the focal length of the third lens group becomes too long, and thus spherical aberration is insufficiently corrected. Therefore, it is difficult to obtain a zoom lens having favorable optical performance. In addition, when the focal length of the third lens group becomes long, the total optical length also becomes long, and thus it is difficult to obtain a compact zoom lens.

In order to obtain the above effect, the lower limit value of conditional expression (12) is more preferably 0.28 and further preferably 0.3. In addition, the upper limit value of conditional expression (12) is more preferably 2.1 and further preferably 2.0.

1-3-13. Conditional Expression (13)

$$1.2 \leq f3/f4 \leq 6.3$$

where f3 is the focal length of the third lens group.

Conditional expression (13) is an expression defining the ratio between the focal length of the third lens group and the focal length of the fourth lens group. When conditional expression (13) is satisfied, it is possible to set the focal length of the fourth lens group within an appropriate range, and it is possible to favorably correct comatic aberration.

Meanwhile, when the value of conditional expression (13) is less than a lower limit value, the focal length of the fourth lens group becomes too short, and thus comatic aberration is excessively corrected. Therefore, it is difficult to obtain a zoom lens having high optical performance. On the other hand, when the value of conditional expression (13) is larger than an upper limit value, the focal length of the fourth lens group becomes too long, and thus comatic aberration is insufficiently corrected. Therefore, it is difficult to obtain a Zoom lens having high optical performance.

In order to obtain the above effect, the lower limit value of conditional expression (13) is more preferably 1.3 and further preferably 1.4. In addition, the upper limit value of conditional expression (13) is more preferably 6.0 and further preferably 5.7.

1-3-14. Conditional Expression (14)

$$vd2p \leq 25$$

where vd2p is an Abbe number for the d line of the positive lens of the second lens group.

Conditional expression (14) is an expression defining an upper limit of the Abbe number of the positive lens of the second lens group. When conditional expression (14) is satisfied, it is possible to favorably correct axial chromatic aberration and magnification chromatic aberration occurring in the second lens group; and thereby, a zoom lens having high optical performance can be obtained.

Meanwhile, when the value of conditional expression (14) is larger than an upper limit value, the dispersion of the positive lens is reduced, and thus it is difficult to correct the axial chromatic aberration and the magnification chromatic aberration occurring in the second lens group.

In order to obtain the above effect, the upper limit value of conditional expression (14) is more preferably 21.0 and further preferably 18.0.

2. Imaging Device

Next, an imaging device according to the invention will be described. The imaging device according to the invention is characterized by including the zoom lens according to the invention and an image sensor that converts an optical image, which is formed by the zoom lens, into an electric signal. Incidentally, it is preferable that the image sensor is provided on an image side of the zoom lens.

Here, the image sensor or the like is not particularly limited, and a solid-state image sensor such as a charge coupled device (CCD) sensor or a complementary metal oxide semiconductor (CMOS) sensor can be also used. The imaging device according to the invention is suitable for an imaging device such as a digital camera or a video camera using the solid-state image sensor. In addition, the imaging device can be applied to various imaging devices such as a single lens reflex camera, a mirrorless camera, a digital still camera, a surveillance camera, an in-vehicle camera, and a drone mounted camera. In addition, the imaging devices may be interchangeable lens imaging devices or may be fixed lens imaging devices in each of which a lens is fixed to a housing.

Next, the invention will be specifically described with reference to embodiments. However, the invention is not limited to the following embodiments.

First Embodiment (1) Optical Configuration of Zoom Lens

Figure 3:
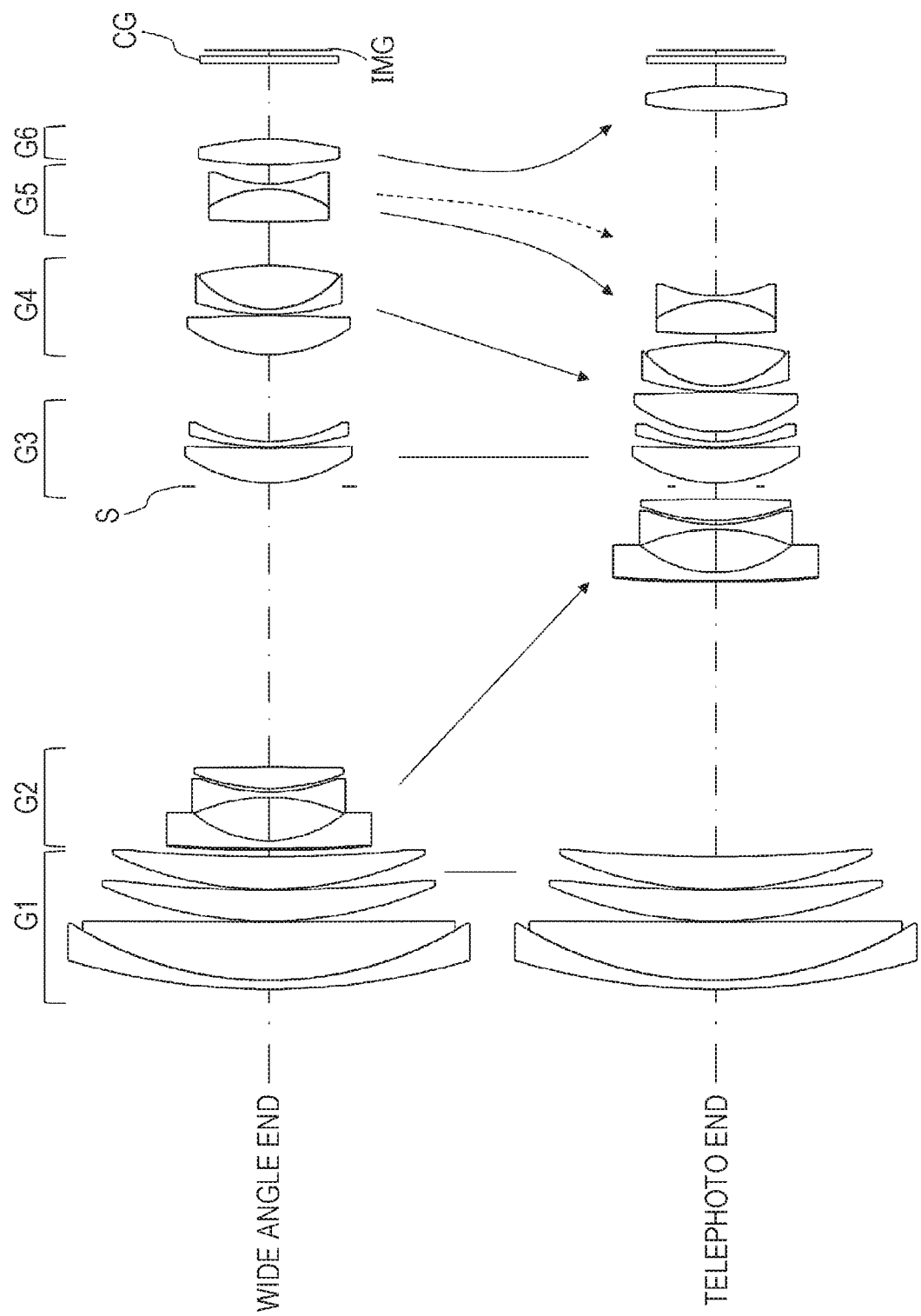
FIG. 3 is a lens cross-sectional view at a wide angle end and a telephoto end of a zoom lens in a first embodiment of the invention.

FIG. 3 illustrates a lens cross-sectional view of a zoom lens in a first embodiment. As illustrated in FIG. 3, the zoom lens in the first embodiment includes, in order from an object side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. An aperture stop S is disposed between the second lens group G2 and the third lens group G3. The aperture stop S is fixed on an optical axis during zooming. During zooming from a wide angle end to a telephoto end, the first lens group G1 and the third lens group G3 are fixed on an optical axis direction, the second lens group G2 moves to an image side, the fourth lens group G4 moves to the object side, the fifth lens group G5 moves to the object side, and the sixth lens group G6 moves to the image side along a trajectory convex toward the object side. During focusing from an infinite object to a near object, the fifth lens group G5 moves to the object side. A lens disposed closest to the object side in the fourth lens group G4 is a lens made of a plastic glass material. Hereinafter, the configuration of each lens group will be described.

The first lens group G1 includes, in order from the object side, a doublet lens made up of a negative meniscus lens having a convex surface toward the object side and a positive meniscus lens having a convex surface toward the object side, a positive meniscus lens having a convex surface toward the object side, and a positive meniscus lens having a convex surface toward the object side.

The second lens group G2 includes, in order from the object side, a negative meniscus lens to the object side surface of which a composite resin film molded in an aspherical surface shape is affixed and which has a convex surface toward the object side, a biconcave lens, and a biconvex lens.

The third lens group G3 includes, in order from the object side, a positive meniscus lens having a convex surface toward the object side and a negative meniscus lens having a convex surface toward the object side.

The fourth lens group G4 includes, in order from the object side, a biconvex lens and a doublet lens, which is made up of a negative meniscus lens having a convex surface toward the object side and a biconvex lens.

The fifth lens group G5 includes, in order from the object side, a doublet lens made up of a biconvex lens and a biconcave lens.

The sixth lens group G6 includes a biconvex lens.

(2) Numerical Value Example

Next, a numerical value example where specific numerical values of the lens are applied will be described. Hereinafter, "lens data", "zoom ratio", "various data", "variable interval (during zooming)", "variable interval (during focusing)", "focal length of each lens group", and "aspherical surface data" will be illustrated. In addition, numerical values and the like (refer to Table 2) used to obtain the values of each conditional expression (refer to Table 1) and the values of each conditional expression are collectively illustrated after a sixth embodiment.

The "lens data" is surface data of the lens. In Table 1, "NS" is the order of a lens surface (surface number) counted from the object side, "r" is the radius of curvature of a lens surface, "d" is the thickness of a lens or air gap on the optical axis, "nd" is the refractive index for the d line (wavelength λ=587.6 nm), and "vd" is the Abbe number for the d line. In addition, "ΔPgF" and "ΔPCt" of the positive lens included in the fourth lens group are illustrated. In addition, in the "NS" column, "*" next to the surface number indicates that the lens surface is an aspherical surface, and "S" indicates that the surface is an aperture stop. In the "d" column, "D1", "D2", and the like means that the interval on the optical axis between the lens surfaces is a variable interval that is to be changed during zooming (and during focusing). In addition, in the column of the radius of curvature, "inf" means infinity and means that the lens surface is a plane. "BF" is an interval from a cover glass of the zoom lens to the image sensor. In addition, in a case where the lens surface is convex toward the object side, the radius of curvature has a positive (+) sign. Incidentally, in Table 1 and each table to be described below, all the units of lengths are "mm" and all the units of angles of view are "°".

The "zoom ratio" is the value of "ft/fw". In the "various data", "f" is the focal length of the zoom lens, "Fno" is the F number, and "G)" is the half angle of view. In addition, "various data" illustrates an image height and the total lens length. The total lens length is the value of an air-converted length into which the thickness of the cover glass is converted. In addition, regarding the variable interval, intervals on the optical axis which are to be changed during zooming and during focusing are the "variable interval (during zooming)" and the "variable interval (during focusing)", respectively. In the "focal length of each lens group", surface numbers included in each lens group are also illustrated.

In the aspherical surface data, the aspherical coefficient defined as follows is illustrated. When the height perpendicular to the optical axis is H, the amount of displacement in the optical axis direction in the height H when the surface vertex is an origin is X(H), the paraxial radius of curvature is R, the cone coefficient is k, and fourth-order, sixth-order, eighth-order, tenth-order, and twelfth-order aspherical coefficients are A, B, C, D, and E, each aspherical surface shape is represented by the following equation. In the "aspherical surface data" table, "E±XX" represents an exponential notation and means "×10±XX".

$$X(H) = \frac{H^2/R}{1 + \sqrt{1 - (1+k)(H^2/R^2)}} + AH^4 + BH^6 + CH^8 + DH^{10} + EH^{12}$$ [Equation 1]

(Lens data)

| NS | r | d | nd | vd | ΔPgF | ΔPCt |
|---|---|---|---|---|---|---|
| 1 | 120.880 | 1.500 | 2.0033 | 28.32 | | |
| 2 | 62.800 | 10.040 | 1.4970 | 81.60 | | |
| 3 | 5420.000 | 0.150 | | | | |
| 4 | 69.900 | 5.300 | 1.4970 | 81.60 | | |
| 5 | 205.500 | 0.150 | | | | |
| 6 | 62.600 | 5.570 | 1.7292 | 54.67 | | |
| 7 | 250.000 | D7 | | | | |
| 8* | 1294.217 | 0.200 | 1.5141 | 49.72 | | |
| 9 | 240.000 | 1.400 | 1.8348 | 42.72 | | |
| 10 | 19.920 | 7.420 | | | | |
| 11 | −30.550 | 0.900 | 1.8042 | 46.50 | | |
| 12 | 30.550 | 0.665 | | | | |
| 13 | 34.400 | 3.600 | 1.9591 | 17.47 | | |
| 14 | −439.000 | D14 | | | | |
| 15S | inf | 0.600 | | | | |
| 16* | 22.939 | 6.000 | 1.6188 | 63.85 | | |
| 17* | 500.000 | 0.200 | | | | |
| 18 | 46.661 | 0.900 | 1.9108 | 35.25 | | |
| 19 | 25.414 | D19 | | | | |
| 20* | 22.269 | 6.717 | 1.5350 | 55.71 | 0.0145 | −0.1211 |
| 21* | −139.630 | 0.200 | | | | |
| 22 | 39.095 | 0.900 | 1.9108 | 35.25 | | |
| 23 | 15.643 | 7.406 | 1.4970 | 81.60 | 0.0375 | −0.0986 |
| 24 | −48.595 | D24 | | | | |
| 25 | 169.055 | 5.600 | 1.8052 | 25.46 | | |
| 26 | −18.659 | 0.900 | 1.9108 | 35.25 | | |
| 27 | 21.831 | D27 | | | | |
| 28* | 60.369 | 4.344 | 1.5891 | 61.25 | | |
| 29* | −42.512 | D29 | | | | |
| 30 | inf | 1.200 | 1.5163 | 64.14 | | |
| 31 | inf | BF | | | | |

(Zoom ratio)

| Zoom ratio | 19.02 |
|---|---|

(Various data)

| | Wide angle end | Intermediate | Telephoto end |
|---|---|---|---|
| f | 14.300 | 50.833 | 271.989 |
| Fno | 1.936 | 3.501 | 5.230 |
| ω | 37.409 | 10.993 | 2.132 |
| Image height | 10.750 | 10.750 | 10.750 |
| Total lens length | 160.970 | 160.970 | 160.970 |

(Variable interval (during zooming))

| | | | |
|---|---|---|---|
| f | 14.300 | 50.833 | 271.989 |
| Imaging distance | inf | inf | inf |
| D7 | 1.180 | 25.106 | 47.097 |
| D14 | 48.117 | 24.191 | 2.200 |
| D19 | 14.894 | 2.466 | 1.700 |
| D24 | 7.600 | 12.858 | 1.628 |
| D27 | 3.246 | 11.675 | 31.582 |
| D29 | 13.070 | 11.812 | 3.900 |
| BF | 1.000 | 1.000 | 1.000 |

-continued

| (Variable interval (during focusing)) | | | |
|---|---|---|---|
| | Wide angle end | Intermediate | Telephoto end |
| Imaging distance | 100 | 3000 | 5000 |
| D24 | 8.465 | 13.223 | 4.814 |
| D27 | 2.381 | 11.310 | 28.397 |

| (Focal length of each lens group) | | |
|---|---|---|
| Group | Surface number | Focal length |
| G1 | 1-7 | 74.110 |
| G2 | 8-14 | −14.973 |
| G3 | 16-19 | 83.395 |
| G4 | 20-24 | 30.456 |
| G5 | 25-27 | −23.846 |
| G6 | 28-29 | 43.016 |

| (Aspherical surface data) | | | | | | |
|---|---|---|---|---|---|---|
| NS | k | A | B | C | D | E |
| 8 | 0.0000 | 8.7075E−06 | −1.2667E−08 | −2.8952E−12 | 1.1447E−13 | −1.9398E−16 |
| 16 | −0.3962 | −3.1935E−06 | −3.2391E−09 | 9.1428E−11 | −4.0392E−13 | 0.0000E+00 |
| 17 | 0.0000 | 2.6763E−06 | 1.4293E−08 | −7.1760E−12 | −2.4307E−13 | 0.0000E+00 |
| 20 | 0.0000 | −7.3335E−06 | 2.9615E−08 | −1.7904E−10 | 4.5458E−13 | 0.0000E+00 |
| 21 | 0.0000 | 7.5216E−06 | 2.0155E−08 | −1.3974E−10 | 4.3368E−13 | 0.0000E+00 |
| 28 | 0.0000 | −1.1916E−05 | 5.8510E−08 | 3.8618E−10 | −3.3096E−12 | 0.0000E+00 |
| 29 | 0.0000 | 9.8457E−06 | −5.2274E−08 | 1.5074E−09 | −7.5729E−12 | 0.0000E+00 |

Figure 4:
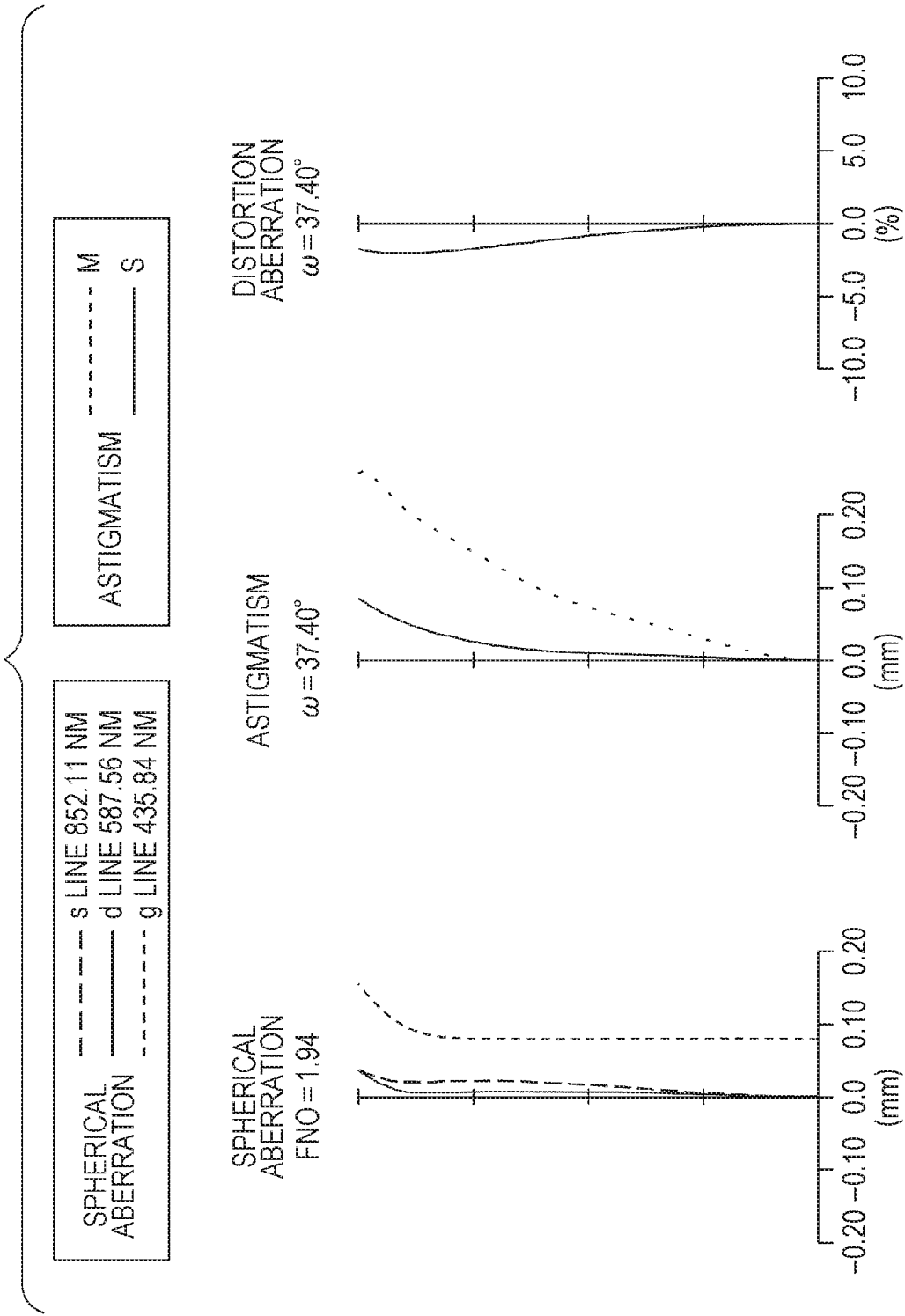
FIG. 4 illustrates various aberration diagrams at the wide angle end of the zoom lens in the first embodiment.
Figure 5:
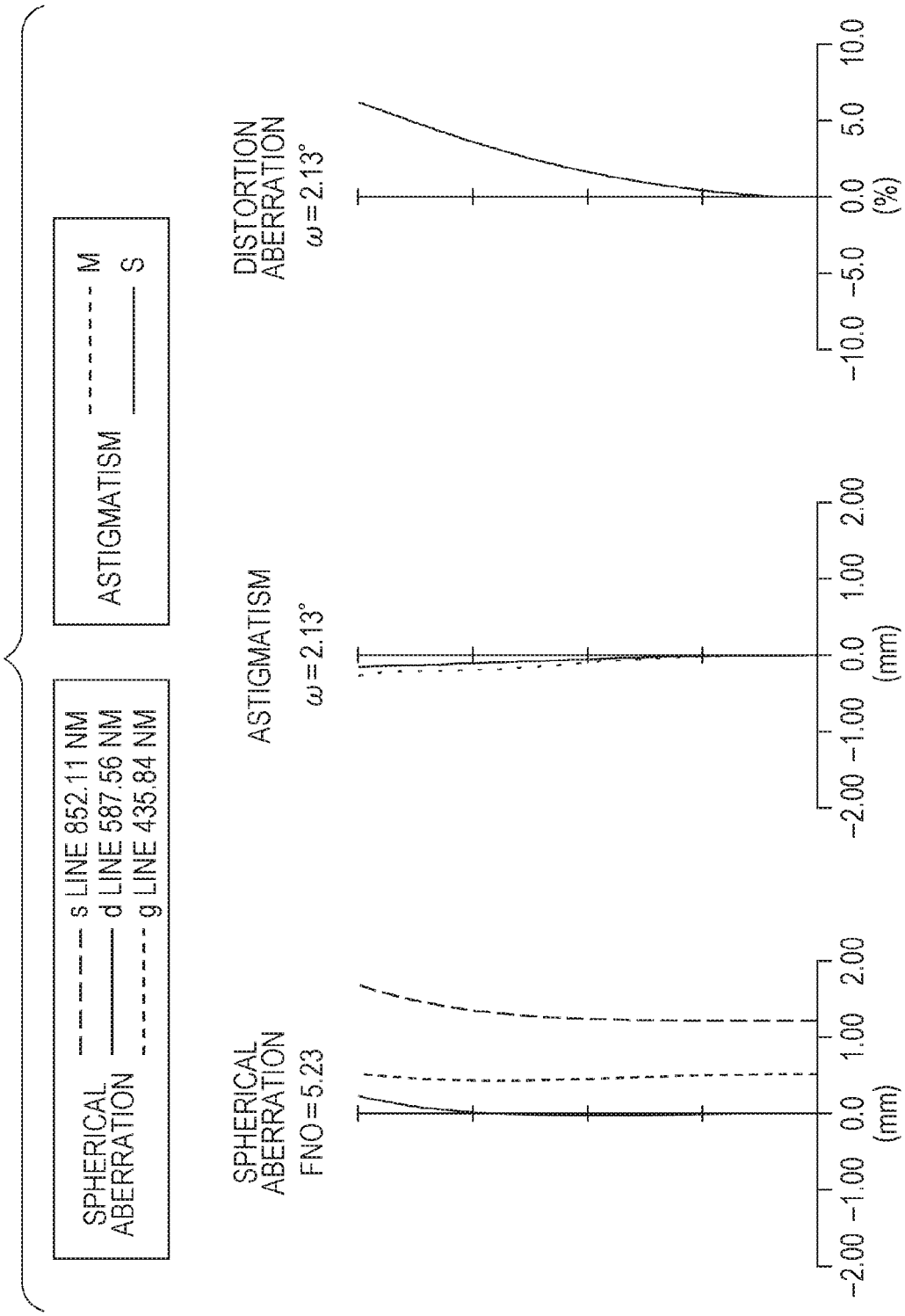
FIG. 5 illustrates various aberration diagrams at the telephoto end of the zoom lens in the first embodiment.

In addition, FIGS. 4 and 5 illustrate longitudinal aberration diagrams when the infinite object is focused at the wide angle end and the telephoto end of the zoom lens. The longitudinal aberration diagrams illustrated in each drawing illustrate, in order from the left of the drawing, spherical aberration (mm), astigmatism (mm), and distortion aberration (%). In the diagram illustrating spherical aberration, the vertical axis is the ratio with respect to an open F number, the horizontal axis is a defocus, FNO is the F number, and spherical aberrations at the wavelengths of the s line, the g line, and the d line (λ=587.6 nm) are illustrated. In the astigmatism diagram, the vertical axis is the half angle of view, the horizontal axis is the defocus, w is the half angle of view (°), M is aberration in a meridional direction, and S is aberration in a sagittal direction. In the distortion aberration diagram, the vertical axis is the half angle of view and the horizontal axis is distortion aberration. Incidentally, the astigmatism diagram and the distortion aberration diagram illustrate values for the d line. Since the above facts are the same in each aberration diagram illustrated in other embodiments, descriptions will be omitted below.

Second Embodiment

Figure 6:
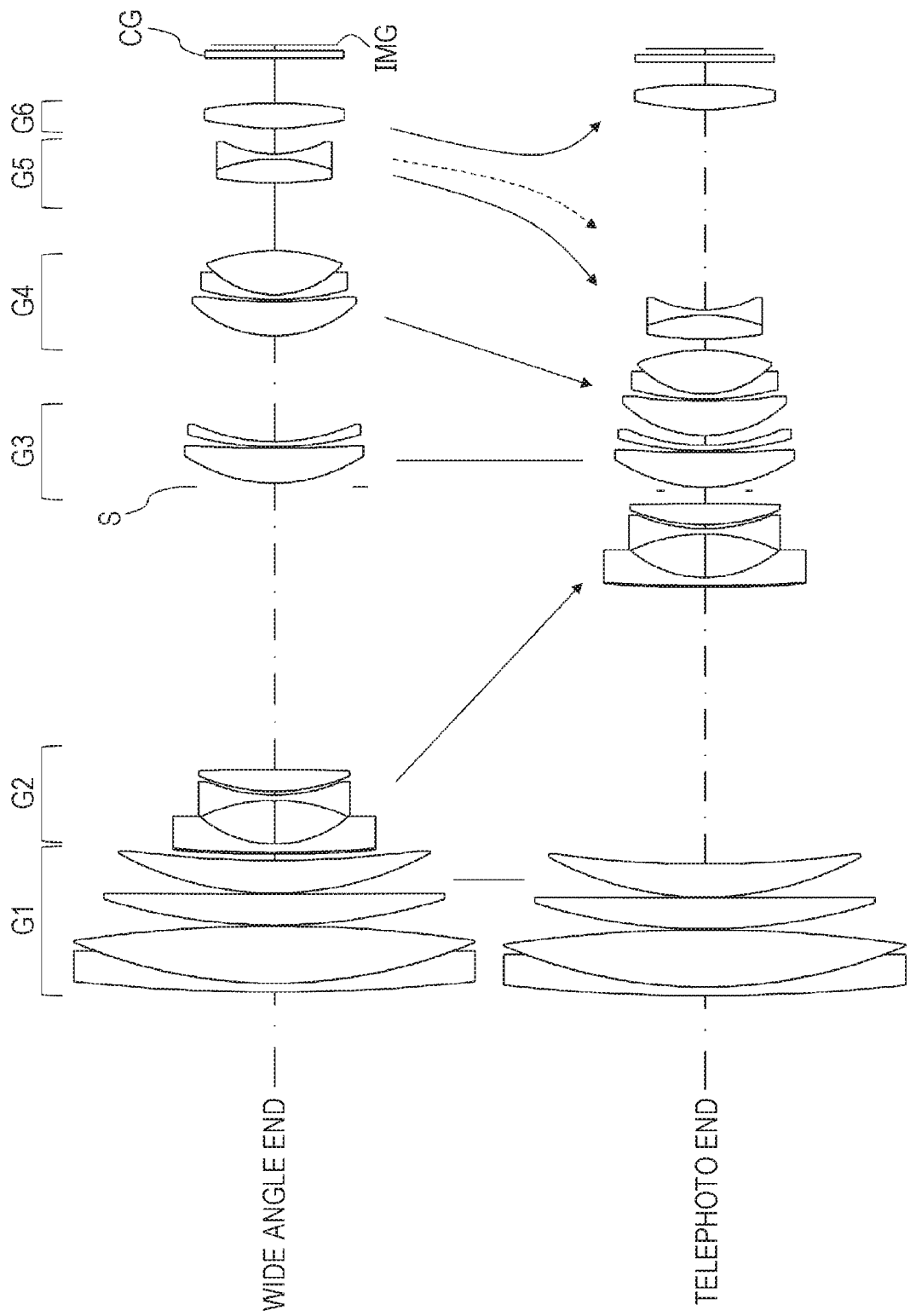
FIG. 6 is a lens cross-sectional view at a wide angle end and a telephoto end of a zoom lens in a second embodiment of the invention.

FIG. 6 illustrates a lens cross-sectional view of a zoom lens in a second embodiment. As illustrated in FIG. 6, the zoom lens in the second embodiment includes, in order from an object side, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having positive refractive power. The aperture stop S is disposed between the second lens group G2 and the third lens group G3. The aperture stop S is fixed on an optical axis during zooming. During zooming from a wide angle end to a telephoto end, the first lens group G1 and the third lens group G3 are fixed on an optical axis direction, the second lens group G2 moves to an image side, the fourth lens group G4 moves to the object side, the fifth lens group G5 moves to the object side, and the sixth lens group G6 moves to the image side along a trajectory convex toward the object side. During focusing from an infinite object to a near object, the fifth lens group G5 moves to the object side. A lens disposed closest to the object side in the fourth lens group G4 is a lens made of a plastic glass material. Hereinafter, the configuration of each lens group will be described.

The first lens group G1 includes, in order from the object side, a doublet lens made up of a negative meniscus lens having a convex surface toward the object side and a biconvex lens, a positive meniscus lens having a convex surface toward the object side, and a positive meniscus lens having a convex surface toward the object side.

The second lens group G2 includes, in order from the object side, a negative meniscus lens to the object side surface of which a composite resin film molded in an aspherical surface shape is affixed and which has a convex surface toward the object side, a biconcave lens, and a biconvex lens.

The third lens group G3 includes, in order from the object side, a positive meniscus lens having a convex surface toward the object side and a negative meniscus lens having a convex surface toward the object side.

The fourth lens group G4 includes, in order from the object side, a positive meniscus lens having a convex surface toward the object side and a doublet lens, which is made up of a negative meniscus lens having a convex surface toward the object side and a biconvex lens.

The fifth lens group G5 includes, in order from the object side, a doublet lens made up of a biconvex lens and a biconcave lens.

The sixth lens group G6 includes a biconvex lens.

(2) Numerical Value Example

Figure 7:
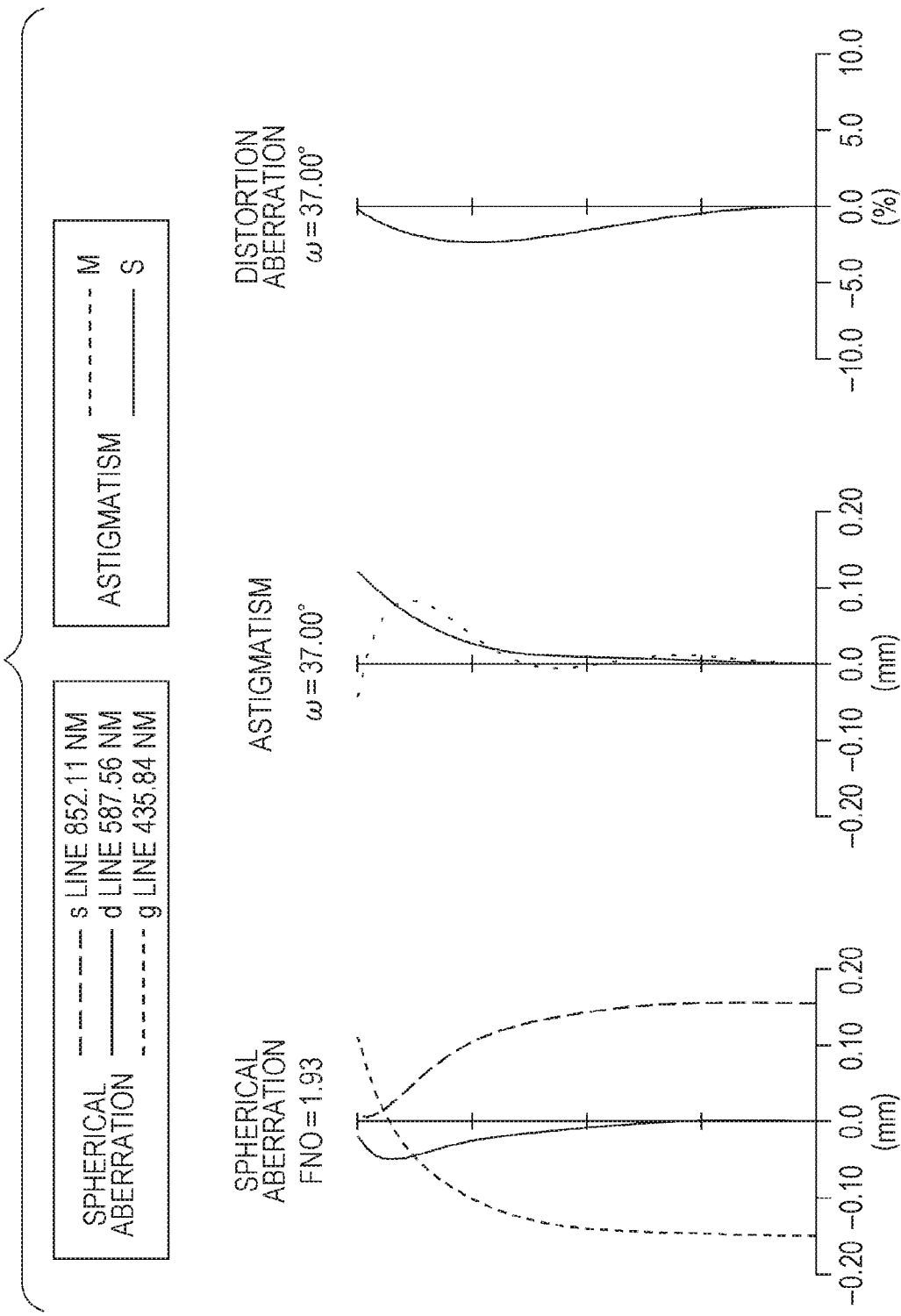
FIG. 7 illustrates various aberration diagrams at the wide angle end of the zoom lens in the second embodiment.
Figure 8:
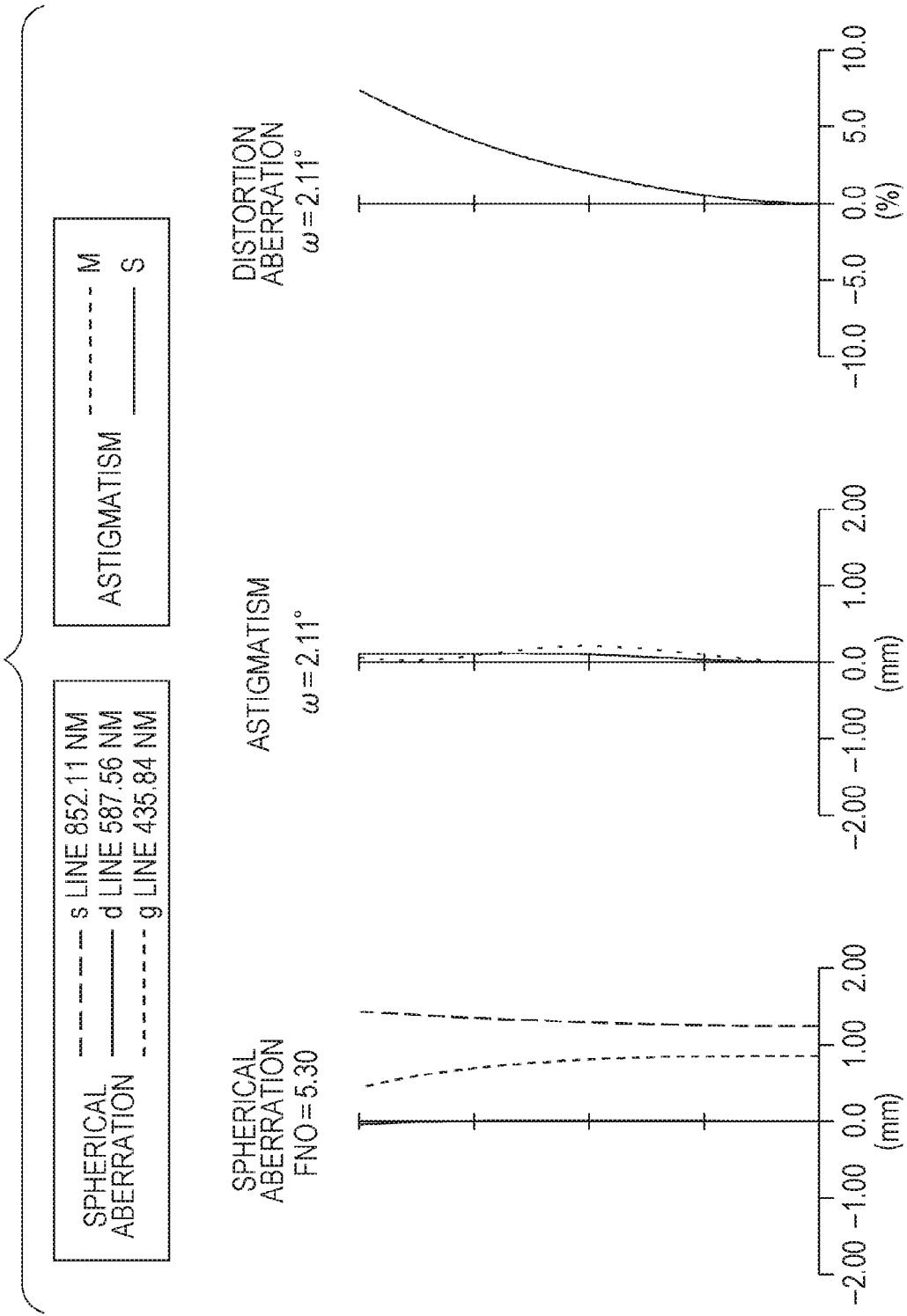
FIG. 8 illustrates various aberration diagrams at the telephoto end of the zoom lens in the second embodiment.

Next, a numerical value example where specific numerical values of the lens are applied will be described. Hereinafter, "lens data", "zoom ratio", "various data", "variable interval (during zooming)", "variable interval (during focusing)", "focal length of each lens group", and "aspherical surface data" will be illustrated. In addition, numerical values and the like (refer to Table 2) used to obtain the values of each conditional expression (refer to Table 1) and the values of each conditional expression are collectively illustrated after a sixth embodiment. In addition, FIGS. 7 and 8 illustrate longitudinal aberration diagrams when the infinite object is focused at the wide angle end and the telephoto end of the zoom lens.

(Lens data)

| NS  | r        | d     | nd     | vd    | ΔPgF   | ΔPCt    |
|-----|----------|-------|--------|-------|--------|---------|
| 1   | 322.064  | 1.500 | 2.0033 | 28.32 |        |         |
| 2   | 86.821   | 9.719 | 1.4970 | 81.60 |        |         |
| 3   | −237.177 | 0.150 |        |       |        |         |
| 4   | 97.280   | 5.300 | 1.4970 | 81.60 |        |         |
| 5   | 4894.757 | 0.150 |        |       |        |         |
| 6   | 55.292   | 5.570 | 1.7292 | 54.67 |        |         |
| 7   | 188.449  | D7    |        |       |        |         |
| 8*  | 1294.217 | 0.200 | 1.5141 | 49.72 |        |         |
| 9   | 240.000  | 1.400 | 1.8348 | 42.72 |        |         |
| 10  | 19.512   | 7.420 |        |       |        |         |
| 11  | −29.808  | 0.900 | 1.8042 | 46.50 |        |         |
| 12  | 29.808   | 0.665 |        |       |        |         |
| 13  | 33.287   | 3.600 | 1.9591 | 17.47 |        |         |
| 14  | −752.913 | D14   |        |       |        |         |
| 15S | inf      | 0.600 |        |       |        |         |
| 16* | 25.844   | 6.000 | 1.6188 | 63.85 |        |         |
| 17* | 500.000  | 0.200 |        |       |        |         |
| 18  | 53.299   | 0.900 | 1.5927 | 35.45 |        |         |
| 19  | 33.492   | D19   |        |       |        |         |
| 20* | 21.172   | 5.887 | 1.5350 | 55.71 | 0.0145 | −0.1211 |
| 21* | 215.956  | 0.254 |        |       |        |         |
| 22  | 45.931   | 0.900 | 1.9108 | 35.25 |        |         |
| 23  | 15.600   | 7.460 | 1.4370 | 95.10 | 0.0558 | −0.1517 |
| 24  | −31.447  | D24   |        |       |        |         |
| 25  | 65.954   | 4.000 | 1.8052 | 25.46 |        |         |
| 26  | −27.850  | 0.900 | 1.9108 | 35.25 |        |         |
| 27  | 19.502   | D27   |        |       |        |         |
| 28* | 31.384   | 4.260 | 1.5891 | 61.25 |        |         |
| 29* | −528.264 | D29   |        |       |        |         |
| 30  | inf      | 1.200 | 1.5163 | 64.14 |        |         |
| 31  | inf      | BF    |        |       |        |         |

(Zoom ratio)

| Zoom ratio | 19.00 |
|---|---|

(Various data)

|   | Wide angle end | Intermediate | Telephoto end |
|---|---|---|---|
| f | 14.311 | 50.750 | 271.972 |
| Fno | 1.932 | 3.495 | 5.300 |
| ω | 36.997 | 11.065 | 2.108 |
| Image height | 10.750 | 10.750 | 10.750 |
| Total lens length | 160.970 | 160.970 | 160.970 |

(Variable interval (during zooming))

| f | 14.311 | 50.750 | 271.972 |
|---|---|---|---|
| Imaging distance | inf | inf | inf |
| D7 | 1.180 | 25.106 | 47.097 |
| D14 | 48.117 | 24.191 | 2.200 |
| D19 | 17.971 | 2.924 | 1.700 |
| D24 | 11.538 | 16.445 | 1.939 |
| D27 | 4.247 | 13.420 | 33.999 |
| D29 | 7.782 | 8.749 | 3.900 |
| BF | 1.000 | 1.000 | 1.000 |

(Variable interval (during focusing))

|   | Wide angle end | Intermediate | Telephoto end |
|---|---|---|---|
| Imaging distance | 100 | 3000 | 5000 |
| D24 | 12.793 | 16.875 | 5.642 |
| D27 | 2.993 | 12.990 | 30.297 |

-continued (Focal length of each lens group)

| Group | Surface number | Focal length |
|---|---|---|
| G1 | 1-7 | 71.261 |
| G2 | 8-14 | −14.376 |
| G3 | 16-19 | 58.200 |
| G4 | 20-24 | 39.466 |
| G5 | 25-27 | −27.222 |
| G6 | 28-29 | 50.427 |

(Aspherical surface data)

| NS | k | A | B | C | D | E |
|---|---|---|---|---|---|---|
| 8 | 0.0000 | 8.7075E−06 | −1.2667E−08 | −2.8952E−12 | 1.1447E−13 | −1.9398E−16 |
| 16 | −0.2999 | −2.0255E−06 | −3.0429E−09 | 5.7438E−11 | −2.3492E−13 | 0.0000E+00 |
| 17 | 0.0000 | 4.7647E−06 | 6.4217E−10 | 3.7707E−11 | −2.1893E−13 | 0.0000E+00 |
| 20 | 0.0000 | 1.2776E−07 | 4.6327E−08 | −1.8737E−10 | 7.9000E−13 | 0.0000E+00 |
| 21 | 0.0000 | 2.0456E−05 | 4.9336E−08 | −2.9641E−10 | 1.0010E−12 | 0.0000E+00 |
| 28 | 0.0000 | −7.0885E−05 | 1.8147E−09 | 3.2865E−09 | −1.3931E−11 | 0.0000E+00 |
| 29 | 0.0000 | −8.0742E−05 | −5.1062E−08 | 5.1590E−09 | −2.0415E−11 | 0.0000E+00 |

Third Embodiment

Figure 9:
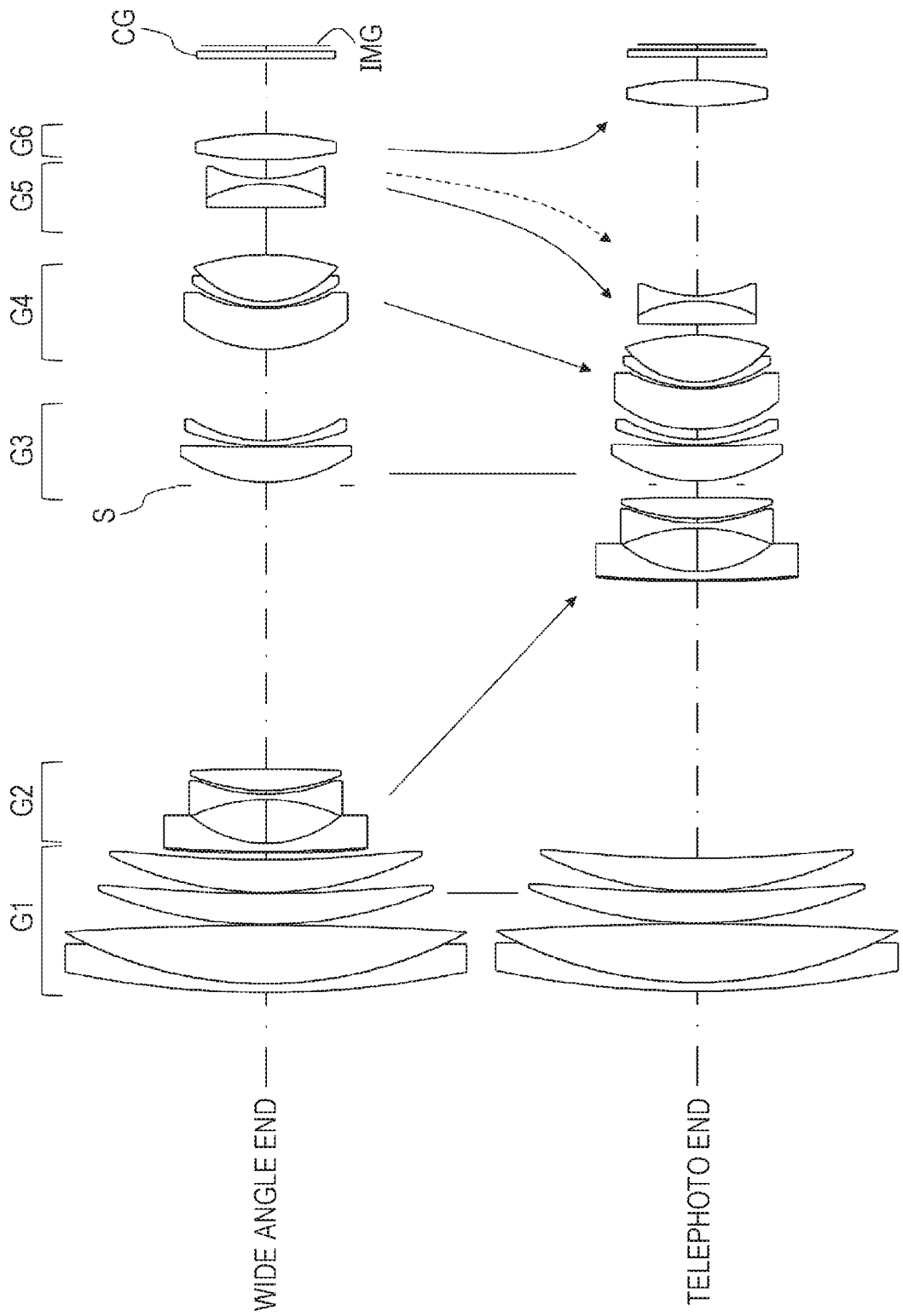
FIG. 9 is a lens cross-sectional view at a wide angle end and a telephoto end of a zoom lens in a third embodiment of the invention.

FIG. 9 illustrates a lens cross-sectional view of a zoom lens in a third embodiment. As illustrated in FIG. 9, the zoom lens in the third embodiment includes, in order from an object side, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having positive refractive power. An aperture stop S is disposed between the second lens group G2 and the third lens group G3. The aperture stop S is fixed on an optical axis during zooming. During zooming from a wide angle end to a telephoto end, the first lens group G1 and the third lens group G3 are fixed on an optical axis direction, the second lens group G2 moves to an image side, the fourth lens group G4 moves to the object side, the fifth lens group G5 moves to the object side, and the sixth lens group G6 moves to the image side along a trajectory convex toward the object side. During focusing from an infinite object to a near object, the fifth lens group G5 moves to the object side. A lens disposed closest to the object side in the fourth lens group G4 is a lens made of a plastic glass material. Hereinafter, the configuration of each lens group will be described.

The first lens group G1 includes, in order from the object side, a doublet lens made up of a negative meniscus lens having a convex surface toward the object side and a biconvex lens, a positive meniscus lens having a convex surface toward the object side, and a positive meniscus lens having a convex surface toward the object side.

The second lens group G2 includes, in order from the object side, a negative meniscus lens to the object side surface of which a composite resin film molded in an aspherical surface shape is affixed and which has a convex surface toward the object side, a biconcave lens, and a biconvex lens.

The third lens group G3 includes, in order from the object side, a positive meniscus lens having a convex surface toward the object side and a negative meniscus lens having a convex surface toward the object side.

The fourth lens group G4 includes, in order from the object side, a positive meniscus lens having a convex surface toward the object side and a doublet lens, which is made up of a negative meniscus lens having a convex surface toward the object side and a biconvex lens.

The fifth lens group G5 includes, in order from the object side, a doublet lens made up of a biconvex lens and a biconcave lens.

The sixth lens group G6 includes a biconvex lens.

(2) Numerical Value Example

Figure 10:
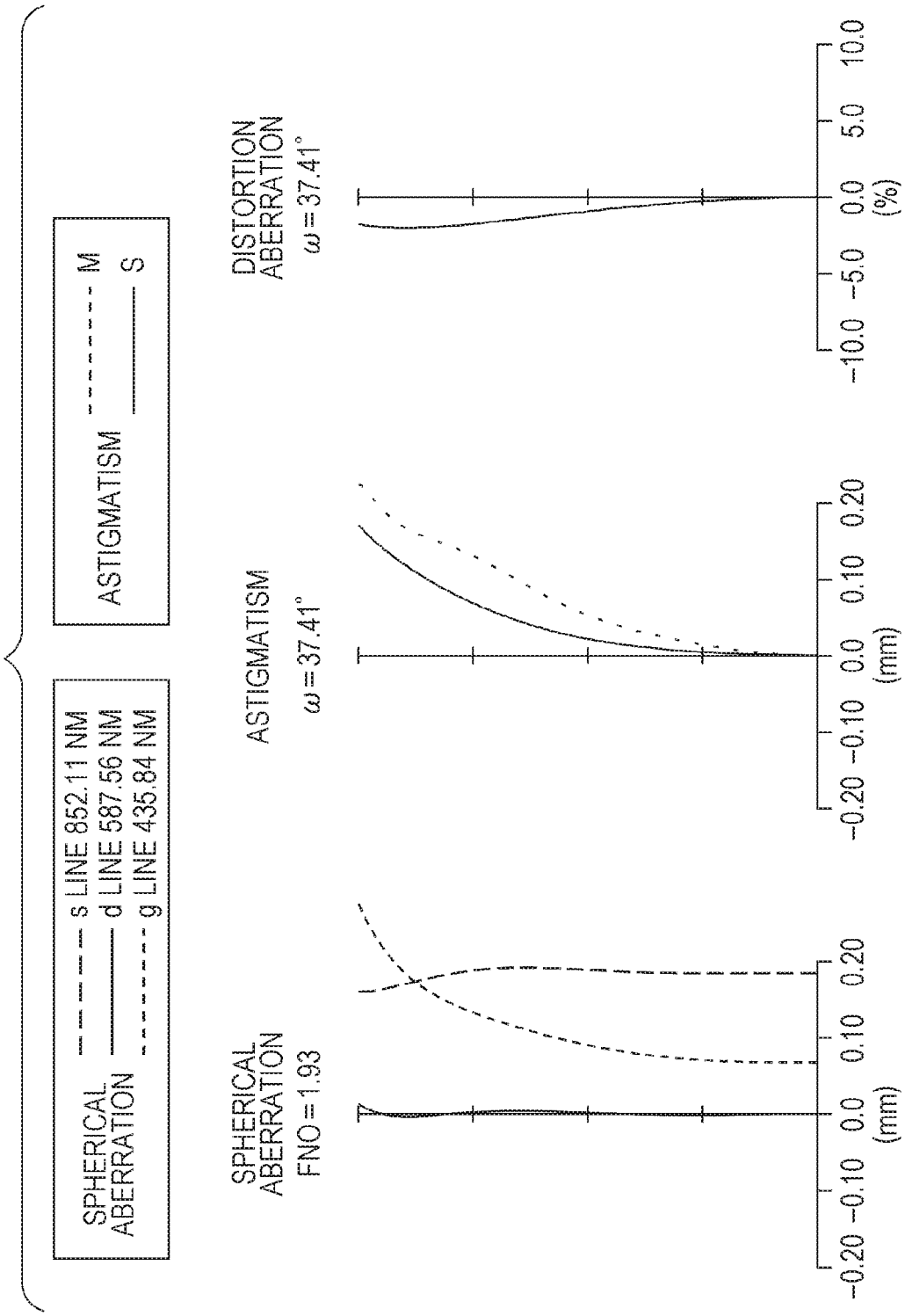
FIG. 10 illustrates various aberration diagrams at the wide angle end of the zoom lens in the third embodiment.
Figure 11:
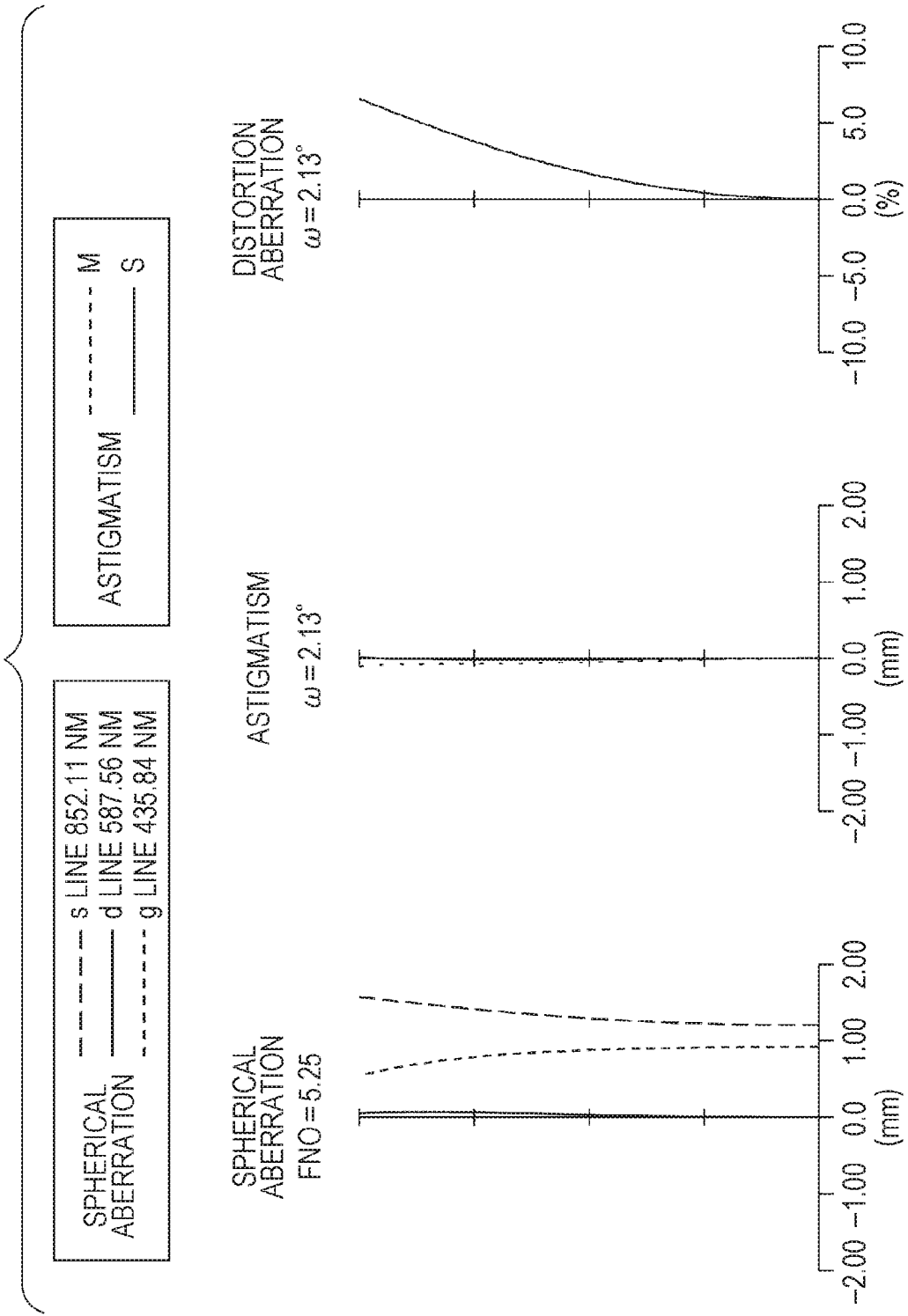
FIG. 11 illustrates various aberration diagrams at the telephoto end of the zoom lens in the third embodiment.

Next, a numerical value example where specific numerical values of the lens are applied will be described. Hereinafter, "lens data", "zoom ratio", "various data", "variable interval (during zooming)", "variable interval (during focusing)", "focal length of each lens group", and "aspherical surface data" will be illustrated. In addition, numerical values and the like (refer to Table 2) used to obtain the values of each conditional expression (refer to Table 1) and the values of each conditional expression are collectively illustrated after a sixth embodiment. In addition, FIGS. 10 and 11 illustrate longitudinal aberration diagrams when the infinite object is focused at the wide angle end and the telephoto end of the zoom lens.

(Lens data)

| NS | r | d | nd | vd | ΔPgF | ΔPCt |
|---|---|---|---|---|---|---|
| 1 | 167.370 | 1.500 | 2.0033 | 28.32 | | |
| 2 | 71.267 | 9.933 | 1.4970 | 81.60 | | |
| 3 | −507.735 | 0.150 | | | | |
| 4 | 72.599 | 5.300 | 1.4970 | 81.60 | | |
| 5 | 262.161 | 0.150 | | | | |
| 6 | 59.470 | 5.570 | 1.7292 | 54.67 | | |
| 7 | 211.054 | D7 | | | | |
| 8* | 1294.217 | 0.200 | 1.5141 | 49.72 | | |

-continued

| | | | | | | |
|---|---|---|---|---|---|---|
| 9 | 240.000 | 1.400 | 1.8348 | 42.72 | | |
| 10 | 19.629 | 7.420 | | | | |
| 11 | −29.868 | 0.900 | 1.8042 | 46.50 | | |
| 12 | 29.868 | 0.665 | | | | |
| 13 | 33.614 | 3.600 | 1.9591 | 17.47 | | |
| 14 | −316.842 | D14 | | | | |
| 15S | inf | 0.600 | | | | |
| 16* | 23.692 | 6.000 | 1.6188 | 63.85 | | |
| 17* | 500.000 | 0.200 | | | | |
| 18 | 37.355 | 0.900 | 1.8467 | 23.78 | | |
| 19 | 23.756 | D19 | | | | |
| 20* | 25.244 | 6.944 | 1.5350 | 55.71 | 0.0145 | −0.1211 |
| 21* | 34.077 | 0.212 | | | | |
| 22 | 21.538 | 0.900 | 1.9108 | 35.25 | | |
| 23 | 15.602 | 7.981 | 1.4970 | 81.60 | 0.0375 | −0.0986 |
| 24 | −37.052 | D24 | | | | |
| 25 | 382.322 | 4.012 | 1.8052 | 25.46 | | |
| 26 | −21.857 | 0.900 | 1.9108 | 35.25 | | |
| 27 | 21.738 | D27 | | | | |
| 28* | 52.740 | 4.431 | 1.5891 | 61.25 | | |
| 29* | −44.687 | D29 | | | | |
| 30 | inf | 1.200 | 1.5163 | 64.14 | | |
| 31 | inf | BF | | | | |

(Zoom ratio)

| | |
|---|---|
| Zoom ratio | 19.01 |

(Various data)

| | Wide angle end | Intermediate | Telephoto end |
|---|---|---|---|
| f | 14.305 | 50.820 | 271.978 |
| Fno | 1.931 | 3.500 | 5.245 |
| ω | 37.407 | 11.007 | 2.125 |
| Image height | 10.750 | 10.750 | 10.750 |
| Total lens length | 160.970 | 160.970 | 160.970 |

(Variable interval (during zooming))

| | | | |
|---|---|---|---|
| f | 14.305 | 50.820 | 271.978 |
| Imaging distance | inf | inf | inf |
| D7 | 1.180 | 25.106 | 47.097 |
| D14 | 48.117 | 24.191 | 2.200 |
| D19 | 15.603 | 2.200 | 1.700 |
| D24 | 8.041 | 12.559 | 1.817 |
| D27 | 3.124 | 14.028 | 32.190 |
| D29 | 12.839 | 10.821 | 3.900 |
| BF | 1.000 | 1.000 | 1.000 |

(Variable interval (during focusing))

| | Wide angle end | Intermediate | Telephoto end |
|---|---|---|---|
| Imaging distance | 100 | 3000 | 5000 |
| D24 | 8.847 | 12.869 | 4.715 |
| D27 | 2.318 | 13.718 | 29.292 |

(Focal length of each lens group)

| Group | Surface number | Focal length |
|---|---|---|
| G1 | 1-7 | 72.926 |
| G2 | 8-14 | −14.966 |
| G3 | 16-19 | 70.743 |
| G4 | 20-24 | 31.194 |
| G5 | 25-27 | −22.492 |
| G6 | 28-29 | 41.765 |

(Aspherical surface data)

| NS | k | A | B | C | D | E |
|---|---|---|---|---|---|---|
| 8 | 0.0000 | 8.7075E−06 | −1.2667E−08 | −2.8952E−12 | 1.1447E−13 | −1.9398E−16 |
| 16 | −0.4064 | −3.2629E−06 | −4.8867E−09 | 6.0483E−11 | −1.3813E−13 | 0.0000E+00 |
| 17 | 0.0000 | 2.8777E−06 | −2.3898E−09 | 3.9409E−11 | −8.9855E−14 | 0.0000E+00 |
| 20 | 0.0000 | 1.7784E−05 | 1.2365E−08 | −1.0645E−10 | 1.0890E−13 | 0.0000E+00 |

-continued

| | | | | | |
|---|---|---|---|---|---|
| 21 | 0.0000 | 4.0170E−05 | 3.6760E−08 | −1.1550E−10 | −2.0618E−13 | 0.0000E+00 |
| 28 | 0.0000 | −3.9200E−06 | −1.6020E−08 | 6.3681E−11 | −8.3165E−13 | 0.0000E+00 |
| 29 | 0.0000 | 1.6386E−05 | −2.7853E−08 | 1.5934E−11 | −8.5915E−13 | 0.0000E+00 |

Fourth Embodiment

Figure 12:
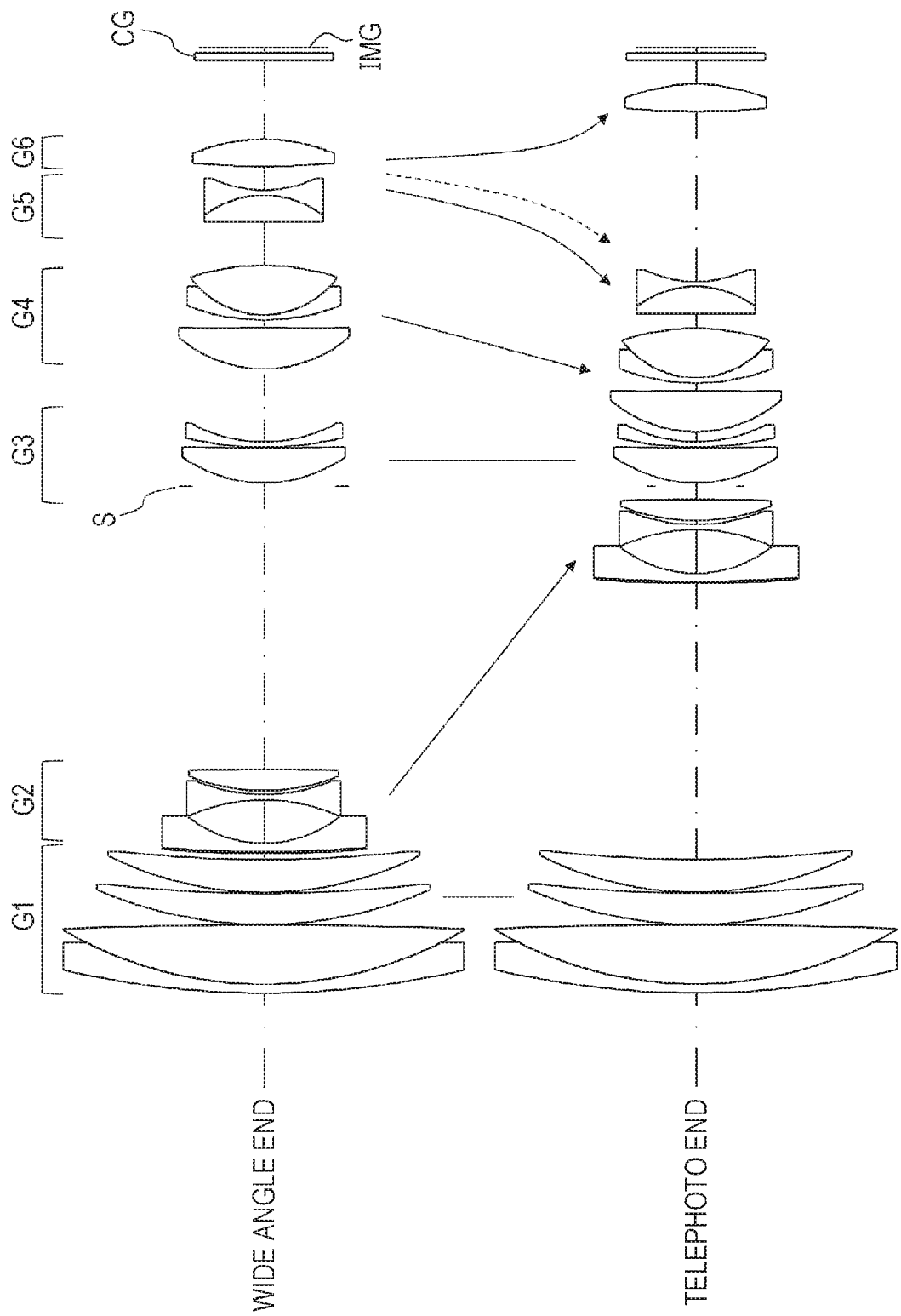
FIG. 12 is a lens cross-sectional view at a wide angle end and a telephoto end of a zoom lens in a fourth embodiment of the invention.

FIG. 12 illustrates a lens cross-sectional view of a zoom lens in a fourth embodiment. As illustrated in FIG. 12, the zoom lens in the fourth embodiment includes, in order from an object side, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having positive refractive power. An aperture stop S is disposed between the second lens group G2 and the third lens group G3. The aperture stop S is fixed on an optical axis during zooming. During zooming from a wide angle end to a telephoto end, the first lens group G1 and the third lens group G3 are fixed on an optical axis direction, the second lens group G2 moves to an image side, the fourth lens group G4 moves to the object side, the fifth lens group G5 moves to the object side, and the sixth lens group G6 moves to the image side. During focusing from an infinite object to a near object, the fifth lens group G5 moves to the object side. A lens disposed closest to the object side in the fourth lens group G4 is a lens made of a plastic glass material. Hereinafter, the configuration of each lens group will be described.

The first lens group G1 includes, in order from the object side, a doublet lens made up of a negative meniscus lens having a convex surface toward the object side and a biconvex lens, a positive meniscus lens having a convex surface toward the object side, and a positive meniscus lens having a convex surface toward the object side.

The second lens group G2 includes, in order from the object side, a negative meniscus lens to the object side surface of which a composite resin film molded in an aspherical surface shape is affixed and which has a convex surface toward the object side, a biconcave lens, and a biconvex lens.

The third lens group G3 includes, in order from the object side, a positive meniscus lens having a convex surface toward the object side and a negative meniscus lens having a convex surface toward the object side.

The fourth lens group G4 includes, in order from the object side, a biconvex lens and a doublet lens, which is made up of a negative meniscus lens having a convex surface toward the object side and a biconvex lens.

The fifth lens group G5 includes, in order from the object side, a doublet lens made up of a positive meniscus lens having a concave surface toward the object side and a biconcave lens arranged.

The sixth lens group G6 includes a biconvex lens.

(2) Numerical Value Example

Figure 13:
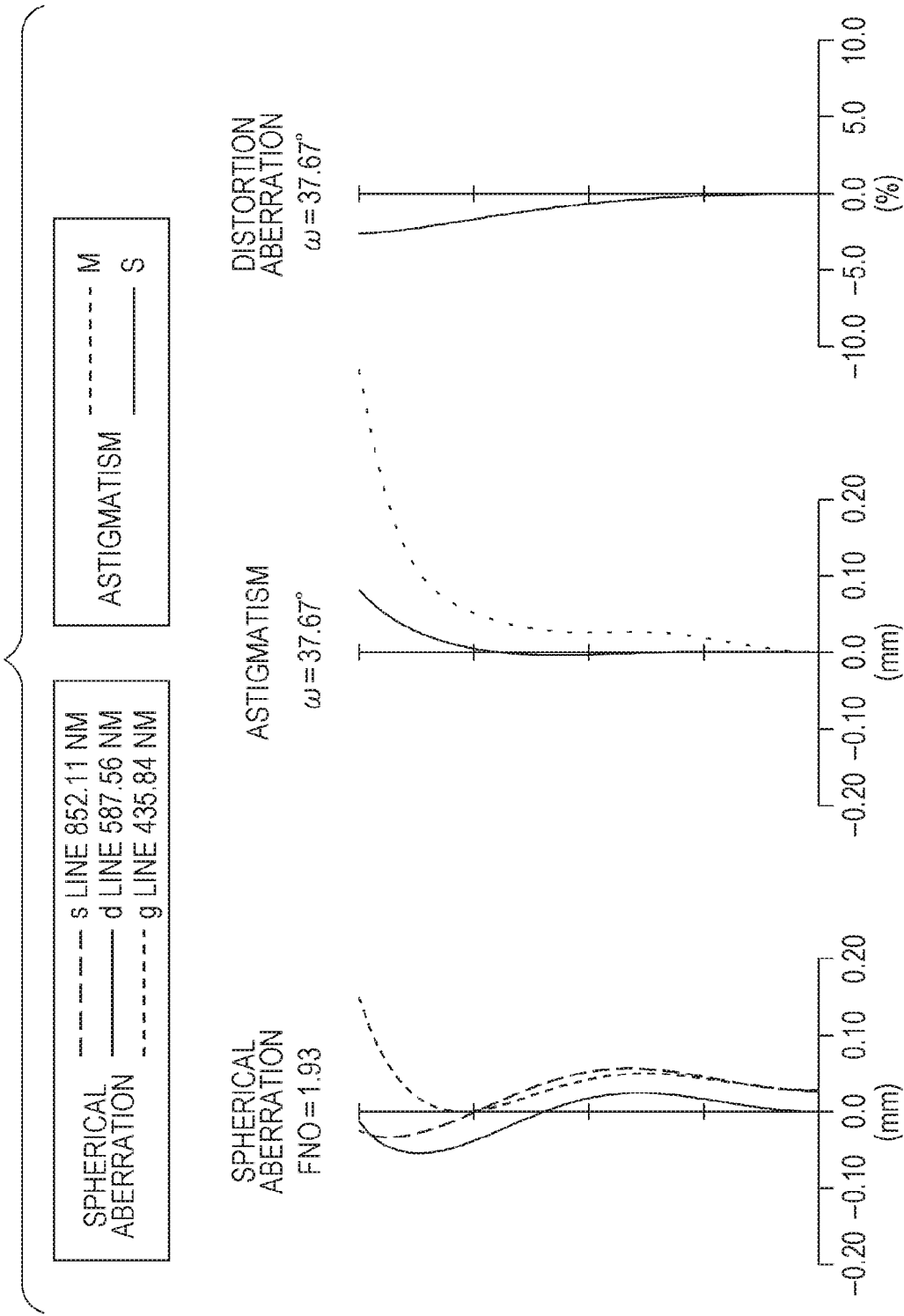
FIG. 13 illustrates various aberration diagrams at the wide angle end of the zoom lens in the fourth embodiment.
Figure 14:
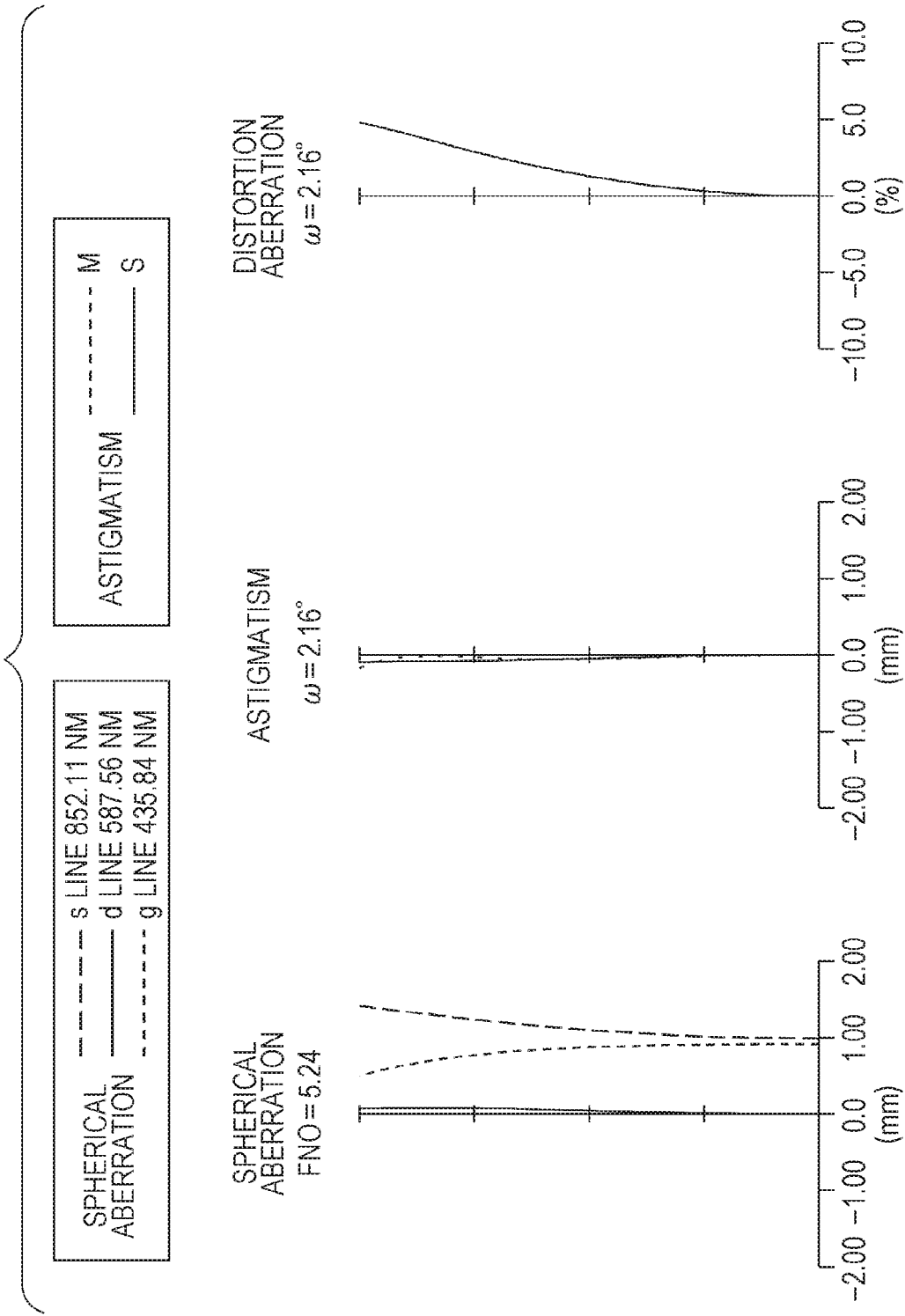
FIG. 14 illustrates various aberration diagrams at the telephoto end of the zoom lens in the fourth embodiment.

Next, a numerical value example where specific numerical values of the lens are applied will be described. Hereinafter, "lens data", "zoom ratio", "various data", "variable interval (during zooming)", "variable interval (during focusing)", "focal length of each lens group", and "aspherical surface data" will be illustrated. In addition, numerical values and the like (refer to Table 2) used to obtain the values of each conditional expression (refer to Table 1) and the values of each conditional expression are collectively illustrated after a sixth embodiment. In addition, FIGS. 13 and 14 illustrate longitudinal aberration diagrams when the infinite object is focused at the wide angle end and the telephoto end of the zoom lens.

| (Lens data) | | | | | | |
|---|---|---|---|---|---|---|
| NS | r | d | nd | vd | ΔPgF | ΔPCt |
| 1 | 149.746 | 1.500 | 2.0033 | 28.32 | | |
| 2 | 67.933 | 10.040 | 1.4970 | 81.60 | | |
| 3 | −977.568 | 0.150 | | | | |
| 4 | 71.015 | 5.300 | 1.4970 | 81.60 | | |
| 5 | 235.734 | 0.150 | | | | |
| 6 | 59.516 | 5.570 | 1.7292 | 54.67 | | |
| 7 | 215.260 | D7 | | | | |
| 8* | 1294.217 | 0.200 | 1.5141 | 49.72 | | |
| 9 | 240.000 | 1.400 | 1.8348 | 42.72 | | |
| 10 | 20.678 | 7.420 | | | | |
| 11 | −30.520 | 0.900 | 1.8042 | 46.50 | | |
| 12 | 30.520 | 0.665 | | | | |
| 13 | 34.711 | 3.600 | 1.9591 | 17.47 | | |
| 14 | −345.629 | D14 | | | | |
| 15S | inf | 0.600 | | | | |
| 16* | 22.745 | 5.907 | 1.5533 | 71.68 | | |
| 17* | 500.000 | 0.200 | | | | |
| 18 | 57.677 | 0.900 | 1.8830 | 40.80 | | |
| 19 | 26.043 | D19 | | | | |
| 20* | 21.722 | 7.000 | 1.5350 | 55.71 | 0.0145 | −0.1211 |
| 21* | −189.681 | 1.322 | | | | |
| 22 | 36.096 | 0.900 | 1.9108 | 35.25 | | |
| 23 | 15.600 | 8.384 | 1.5503 | 75.50 | 0.0284 | −0.0860 |
| 24 | −40.154 | D24 | | | | |
| 25 | −3961.364 | 4.568 | 1.8052 | 25.46 | | |
| 26 | −16.744 | 0.900 | 1.9108 | 35.25 | | |
| 27 | 20.722 | D27 | | | | |
| 28* | 122.925 | 4.636 | 1.5891 | 61.25 | | |

-continued

| | | | | | |
|---|---|---|---|---|---|
| 29* | −27.889 | D29 | | | |
| 30 | inf | 1.200 | | 1.5163 | 64.14 |
| 31 | inf | BF | | | |

(Zoom ratio)

| Zoom ratio | 19.02 |
|---|---|

(Various data)

| | Wide angle end | Intermediate | Telephoto end |
|---|---|---|---|
| f | 14.300 | 50.808 | 271.979 |
| Fno | 1.930 | 3.499 | 5.242 |
| ω | 37.674 | 11.002 | 2.160 |
| Image height | 10.750 | 10.750 | 10.750 |
| Total lens length | 160.970 | 160.970 | 160.970 |

(Variable interval (during zooming))

| | | | |
|---|---|---|---|
| f | 14.300 | 50.808 | 271.979 |
| Imaging distance | inf | inf | inf |
| D7 | 1.180 | 25.106 | 47.097 |
| D14 | 48.117 | 24.191 | 2.200 |
| D19 | 12.441 | 2.200 | 1.700 |
| D24 | 7.376 | 12.448 | 2.562 |
| D27 | 3.977 | 11.596 | 28.891 |
| D29 | 13.467 | 11.017 | 4.108 |
| BF | 1.000 | 1.000 | 1.000 |

(Variable interval (during focusing))

| | Wide angle end | Intermediate | Telephoto end |
|---|---|---|---|
| Imaging distance | 100 | 3000 | 5000 |
| D24 | 7.940 | 12.733 | 5.180 |
| D27 | 3.413 | 11.311 | 26.273 |

(Focal length of each lens group)

| Group | Surface number | Focal length |
|---|---|---|
| G1 | 1-7 | 73.759 |
| G2 | 8-14 | −15.489 |
| G3 | 16-19 | 140.140 |
| G4 | 20-24 | 25.873 |
| G5 | 25-27 | −19.752 |
| G6 | 28-29 | 39.030 |

(Aspherical surface data)

| NS | k | A | B | C | D | E |
|---|---|---|---|---|---|---|
| 8 | 0.0000 | 8.7075E−06 | −1.2667E−08 | −2.8952E−12 | 1.1447E−13 | −1.9398E−16 |
| 16 | −0.3996 | −3.1482E−06 | −8.3795E−09 | 1.3332E−10 | −5.2342E−13 | 0.0000E+00 |
| 17 | 0.0000 | 1.1150E−06 | 4.7637E−09 | 6.0913E−11 | −3.7826E−13 | 0.0000E+00 |
| 20 | 0.0000 | −6.1635E−06 | 2.8278E−08 | −1.6017E−10 | 4.3006E−13 | 0.0000E+00 |
| 21 | 0.0000 | 1.4344E−05 | 1.7265E−08 | −8.2414E−11 | 2.8455E−13 | 0.0000E+00 |
| 28 | 0.0000 | 1.1352E−07 | −5.9156E−08 | 6.6050E−10 | −2.5777E−12 | 0.0000E+00 |
| 29 | 0.0000 | 2.7793E−05 | −1.5594E−07 | 1.3697E−09 | −5.4149E−12 | 0.0000E+00 |

Fifth Embodiment

Figure 15:
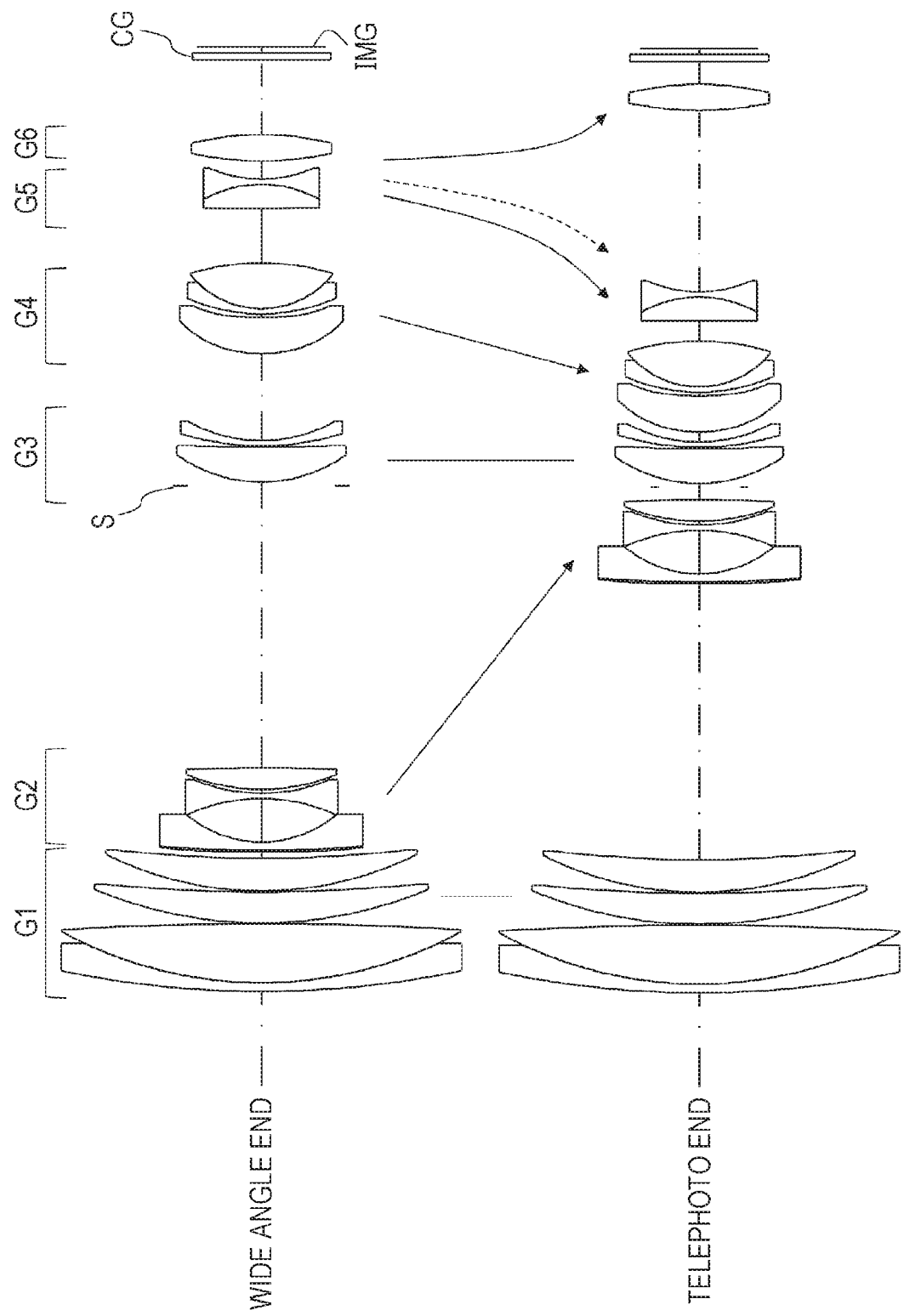
FIG. 15 is a lens cross-sectional view at a wide angle end and a telephoto end of a zoom lens in a fifth embodiment of the invention.

FIG. 15 illustrates a lens cross-sectional view of a zoom lens in a fifth embodiment. As illustrated in FIG. 15, the zoom lens in the fifth embodiment includes, in order from an object side, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having positive refractive power. An aperture stop S is disposed between the second lens group G2 and the third lens group G3. The aperture stop S is fixed on an optical axis during zooming. During zooming from a wide angle end to a telephoto end, the first lens group G1 and the third lens group G3 are fixed on an optical axis direction, the second lens group G2 moves to an image side, the fourth lens group G4 moves to the object side, the fifth lens group G5 moves to the object side, and the sixth lens group G6 moves to the image side. During focusing from an infinite object to a near object, the fifth lens group G5 moves to the object side. A lens disposed closest to the object side in the fourth lens group G4 is a lens made of a plastic glass material. Hereinafter, the configuration of each lens group will be described.

The first lens group G1 includes, in order from the object side, a doublet lens made up of a negative meniscus lens having a convex surface toward the object side and a biconvex lens, a positive meniscus lens having a convex surface toward the object side, and a positive meniscus lens having a convex surface toward the object side.

The second lens group G2 includes, in order from the object side, a negative meniscus lens to the object side surface of which a composite resin film molded in an aspherical surface shape is affixed and which has a convex surface toward the object side, a biconcave lens, and a biconvex lens.

The third lens group G3 includes, in order from the object side, a positive meniscus lens having a convex surface toward the object side and a negative meniscus lens having a convex surface toward the object side.

The fourth lens group G4 includes, in order from the object side, a positive meniscus lens having a convex surface toward the object side and a doublet lens, which is made up of a negative meniscus lens having a convex surface toward the object side and a biconvex lens.

The fifth lens group G5 includes, in order from the object side, a doublet lens made up of a biconvex lens and a biconcave lens.

The sixth lens group G6 includes a biconvex lens.

(2) Numerical Value Example

Figure 16:
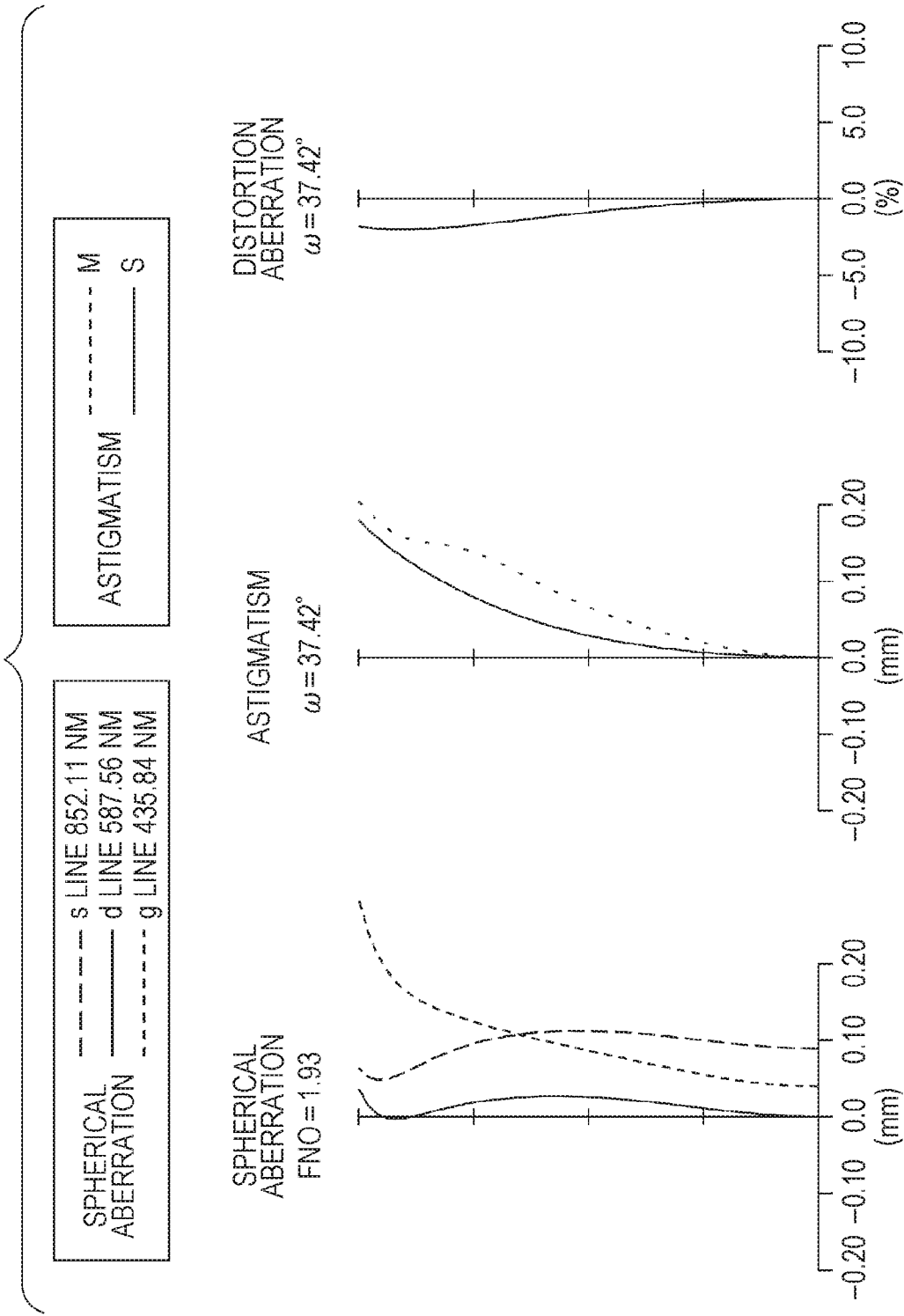
FIG. 16 illustrates various aberration diagrams at the wide angle end of the zoom lens in the fifth embodiment.
Figure 17:
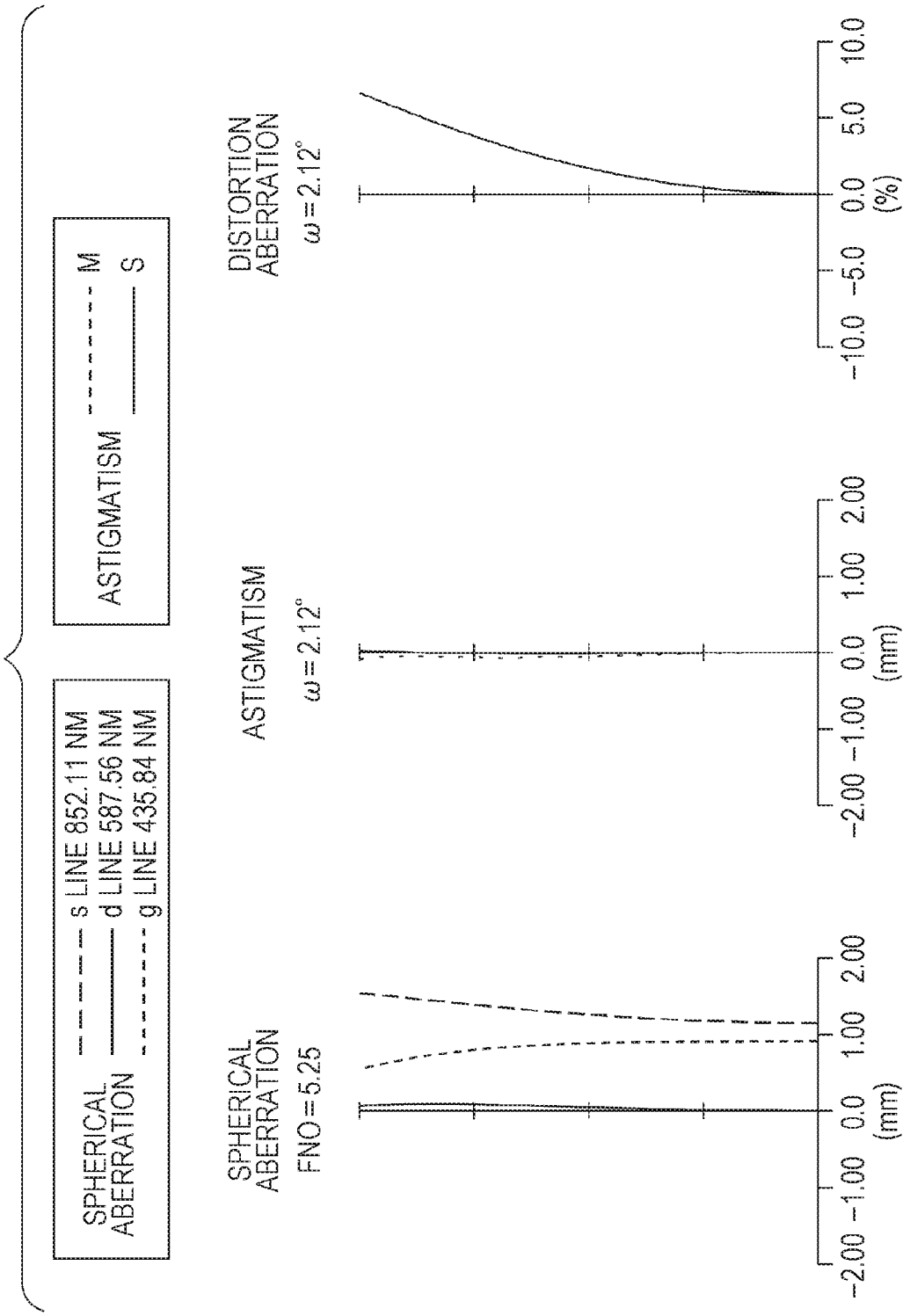
FIG. 17 illustrates various aberration diagrams at the telephoto end of the zoom lens in the fifth embodiment.

Next, a numerical value example where specific numerical values of the lens are applied will be described. Hereinafter, "lens data", "zoom ratio", "various data", "variable interval (during zooming)", "variable interval (during focusing)", "focal length of each lens group", and "aspherical surface data" will be illustrated. In addition, numerical values and the like (refer to Table 2) used to obtain the values of each conditional expression (refer to Table 1) and the values of each conditional expression are collectively illustrated after a sixth embodiment. In addition, FIGS. 16 and 17 illustrate longitudinal aberration diagrams when the infinite object is focused at the wide angle end and the telephoto end of the zoom lens.

(Lens data)

| NS | r | d | nd | vd | ΔPgF | ΔPCt |
|---|---|---|---|---|---|---|
| 1 | 165.767 | 1.500 | 2.0033 | 28.32 | | |
| 2 | 70.908 | 10.040 | 1.4970 | 81.60 | | |
| 3 | −568.750 | 0.150 | | | | |
| 4 | 73.357 | 5.300 | 1.4970 | 81.60 | | |
| 5 | 270.963 | 0.150 | | | | |
| 6 | 59.328 | 5.570 | 1.7292 | 54.67 | | |
| 7 | 212.983 | D7 | | | | |
| 8* | 1294.217 | 0.200 | 1.5141 | 49.72 | | |
| 9 | 240.000 | 1.400 | 1.8348 | 42.72 | | |
| 10 | 19.793 | 7.420 | | | | |
| 11 | −30.238 | 0.900 | 1.8042 | 46.50 | | |
| 12 | 30.238 | 0.665 | | | | |
| 13 | 34.042 | 3.600 | 1.9591 | 17.47 | | |
| 14 | −343.280 | D14 | | | | |
| 15S | inf | 0.600 | | | | |
| 16* | 23.390 | 6.000 | 1.6188 | 63.85 | | |
| 17* | 500.000 | 0.200 | | | | |
| 18 | 46.840 | 0.900 | 1.8588 | 30.00 | | |
| 19 | 25.706 | D19 | | | | |
| 20* | 22.627 | 6.141 | 1.5350 | 55.71 | 0.0145 | −0.1211 |
| 21* | 51.517 | 0.667 | | | | |
| 22 | 31.487 | 0.900 | 1.9108 | 35.25 | | |
| 23 | 15.600 | 7.793 | 1.5928 | 68.62 | 0.0201 | −0.0713 |
| 24 | −42.058 | D24 | | | | |
| 25 | 1027.334 | 4.078 | 1.8052 | 25.46 | | |
| 26 | −20.051 | 0.900 | 1.9108 | 35.25 | | |
| 27 | 22.127 | D27 | | | | |
| 28* | 52.267 | 4.493 | 1.5891 | 61.25 | | |
| 29* | −42.861 | D29 | | | | |
| 30 | inf | 1.200 | 1.5163 | 64.14 | | |
| 31 | inf | BF | | | | |

(Zoom ratio)

| Zoom ratio | 19.01 |
|---|---|

(Various data)

| | Wide angle end | Intermediate | Telephoto end |
|---|---|---|---|
| f | 14.305 | 50.831 | 271.986 |
| Fno | 1.931 | 3.501 | 5.249 |
| ω | 37.416 | 10.997 | 2.123 |
| Image height | 10.750 | 10.750 | 10.750 |
| Total lens length | 160.970 | 160.970 | 160.970 |

(Variable interval (during zooming))

| | | | |
|---|---|---|---|
| f | 14.305 | 50.831 | 271.986 |
| Imaging distance | inf | inf | inf |
| D7 | 1.180 | 25.106 | 47.097 |
| D14 | 48.117 | 24.191 | 2.200 |
| D19 | 14.804 | 2.200 | 1.700 |
| D24 | 9.309 | 14.147 | 3.444 |

-continued

|     |        |        |        |
|-----|--------|--------|--------|
| D27 | 3.049  | 12.532 | 30.862 |
| D29 | 12.744 | 11.026 | 3.900  |
| BF  | 1.000  | 1.000  | 1.000  |

(Variable interval (during focusing))

|                  | Wide angle end | Intermediate | Telephoto end |
|------------------|----------------|--------------|---------------|
| Imaging distance | 100            | 3000         | 5000          |
| D24              | 10.107         | 14.465       | 6.369         |
| D27              | 2.252          | 12.214       | 27.937        |

(Focal length of each lens group)

| Group | Surface number | Focal length |
|-------|----------------|--------------|
| G1    | 1-7            | 73.109       |
| G2    | 8-14           | −15.051      |
| G3    | 16-19          | 80.031       |
| G4    | 20-24          | 30.206       |
| G5    | 25-27          | −21.905      |
| G6    | 28-29          | 40.686       |

(Aspherical surface data)

| NS | k       | A           | B           | C           | D           | E           |
|----|---------|-------------|-------------|-------------|-------------|-------------|
| 8  | 0.0000  | 8.7075E−06  | −1.2667E−08 | −2.8952E−12 | 1.1447E−13  | −1.9398E−16 |
| 16 | −0.4056 | −3.2672E−06 | −3.9826E−09 | 8.0959E−11  | −1.7270E−13 | 0.0000E+00  |
| 17 | 0.0000  | 3.3954E−06  | −2.8089E−09 | 9.3231E−11  | −2.4093E−13 | 0.0000E+00  |
| 20 | 0.0000  | 1.1947E−05  | 4.1238E−08  | −1.4107E−10 | 1.0439E−12  | 0.0000E+00  |
| 21 | 0.0000  | 3.1087E−05  | 5.3956E−08  | −1.7813E−10 | 1.7589E−12  | 0.0000E+00  |
| 28 | 0.0000  | −8.1505E−06 | 7.1833E−08  | −5.5790E−10 | 6.7478E−13  | 0.0000E+00  |
| 29 | 0.0000  | 1.3068E−05  | 3.8570E−08  | −3.1016E−10 | −5.2572E−13 | 0.0000E+00  |

Sixth Embodiment

Figure 18:
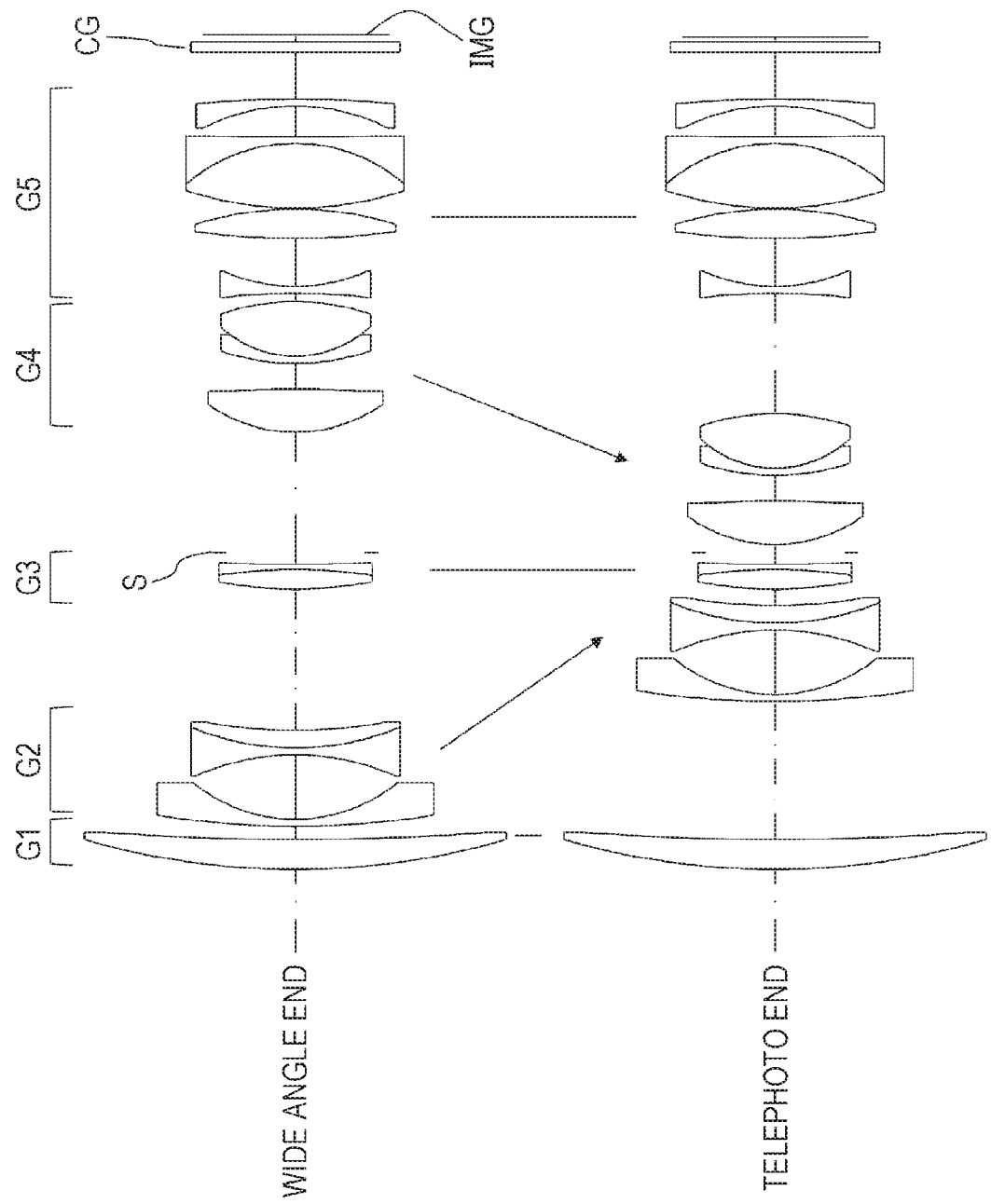
FIG. 18 is a lens cross-sectional view at a wide angle end and a telephoto end of a zoom lens in a sixth embodiment of the invention.

FIG. 18 illustrates a lens cross-sectional view of a zoom lens in a sixth embodiment. As illustrated in FIG. 18, the zoom lens in the sixth embodiment includes, in order from an object side, the first lens group G1 having positive refractive power, the second lens group G2 having negative refractive power, the third lens group G3 having positive refractive power, the fourth lens group G4 having positive refractive power, and the fifth lens group G5 having negative refractive power. The aperture stop S is disposed between the third lens group G3 and the fourth lens group G4. The aperture stop S is fixed on an optical axis during zooming. During zooming from a wide angle end to a telephoto end, the first lens group G1, the third lens group G3, and the fifth lens group G5 are fixed on an optical axis direction, the second lens group G2 moves to an image side, and the fourth lens group G4 moves to the object side. During focusing from an infinite object to a near object, the second lens group G2 moves to the object side. A lens disposed closest to the object side in the fourth lens group G4 is a lens made of a plastic glass material. Hereinafter, the configuration of each lens group will be described.

The first lens group G1 includes a positive meniscus lens having a convex surface toward the object side.

The second lens group G2 includes, in order from the object side, a negative meniscus lens having a convex surface toward the object side and a doublet lens, which is made up of a biconcave lens and a positive meniscus lens having a convex surface toward the object side.

The third lens group G3 includes, in order from the object side, a doublet lens made up of a biconvex lens and a biconcave lens.

The fourth lens group G4 includes, in order from the object side, a biconvex lens and a doublet lens, which is made up of a negative meniscus lens having a convex surface toward the object side and a biconvex lens.

The fifth lens group G5 includes, in order from the object side, a biconcave lens, a biconvex lens, a doublet lens made up of a biconvex lens and a biconcave lens, and a negative meniscus lens having a concave surface toward the object side.

(2) Numerical Value Example

Figure 19:
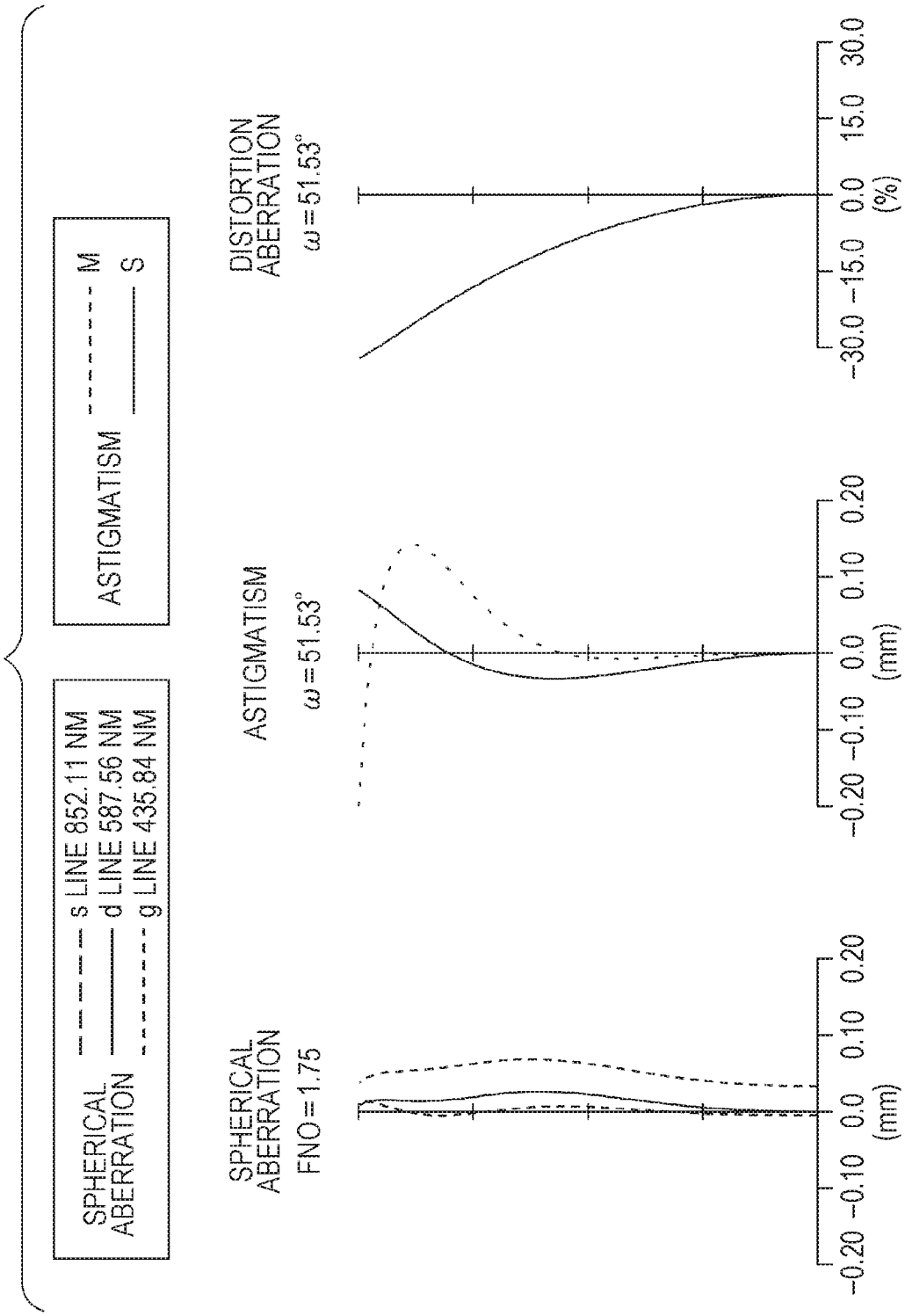
FIG. 19 illustrates various aberration diagrams at the wide angle end of the zoom lens in the sixth embodiment.
Figure 20:
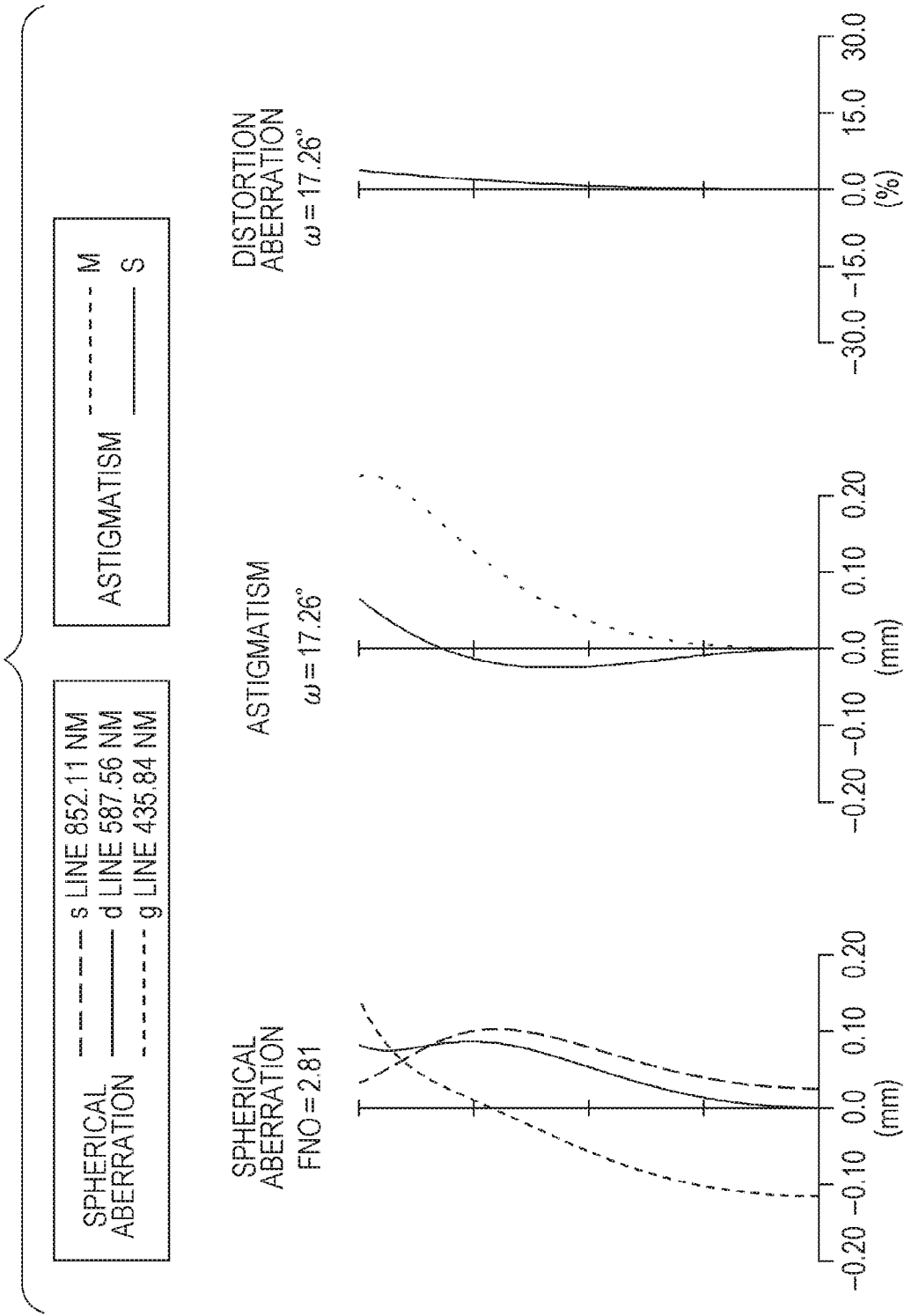
FIG. 20 illustrates various aberration diagrams at the telephoto end of the zoom lens in the sixth embodiment.

Next, a numerical value example where specific numerical values of the lens are applied will be described. Hereinafter, "lens data", "zoom ratio", "various data", "variable interval (during zooming)", "variable interval (during focusing)", "focal length of each lens group", and "aspherical surface data" will be illustrated. In addition, numerical values and the like (refer to Table 2) used to obtain the values of each conditional expression (refer to Table 1) and the values of each conditional expression are collectively illustrated after each table. In addition, FIGS. 19 and 20 illustrate longitudinal aberration diagrams when the infinite object is focused at the wide angle end and the telephoto end of the zoom lens.

(Lens data)

| NS | r       | d     | nd     | vd    | PgF | PCt |
|----|---------|-------|--------|-------|-----|-----|
| 1  | 86.675  | 3.434 | 1.7725 | 49.62 |     |     |
| 2  | 309.707 | D2    |        |       |     |     |

-continued

| | | | | | | |
|---|---|---|---|---|---|---|
| 3 | 100.999 | 0.800 | 1.8707 | 40.73 | | |
| 4 | 18.364 | 7.328 | | | | |
| 5 | −28.194 | 0.800 | 1.6400 | 60.08 | | |
| 6 | 31.328 | 1.997 | 1.9861 | 16.48 | | |
| 7 | 57.231 | D7 | | | | |
| 8 | 47.655 | 2.237 | 2.0010 | 29.13 | | |
| 9 | −54.877 | 0.600 | 1.9037 | 31.31 | | |
| 10 | 232.960 | 1.331 | | | | |
| 11S | inf | 0.000 | | | | |
| 12 | inf | D12 | | | | |
| 13* | 16.500 | 4.958 | 1.5350 | 55.71 | 0.0145 | −0.1211 |
| 14* | −74.761 | 2.924 | | | | |
| 15 | 27.340 | 0.800 | 2.0509 | 26.94 | | |
| 16 | 12.500 | 6.208 | 1.5503 | 75.50 | 0.0284 | −0.0860 |
| 17 | −26.321 | D17 | | | | |
| 18 | −75.493 | 0.800 | 1.8467 | 23.78 | | |
| 19 | 20.395 | 5.480 | | | | |
| 20 | 87.677 | 3.326 | 1.5503 | 75.50 | | |
| 21 | −38.575 | 0.133 | | | | |
| 22 | 40.026 | 7.383 | 1.8081 | 22.76 | | |
| 23 | −18.925 | 0.800 | 1.4875 | 70.44 | | |
| 24 | 951.095 | 3.463 | | | | |
| 25 | −23.232 | 0.800 | 1.8467 | 23.78 | | |
| 26 | −110.581 | 5.300 | | | | |
| 27 | inf | 1.200 | 1.5163 | 64.14 | | |
| 28 | inf | BF | | | | |

(Zoom ratio)

| Zoom ratio | 2.82 |
|---|---|

(Various data)

| | Wide angle end | Intermediate | Telephoto end |
|---|---|---|---|
| f | 11.261 | 18.504 | 31.782 |
| Fno | 1.751 | 2.139 | 2.806 |
| ω | 51.533 | 30.001 | 17.256 |
| Image height | 11.010 | 11.010 | 11.010 |
| Total lens length | 94.960 | 94.960 | 94.960 |

(Variable interval (during zooming))

| f | 11.261 | 18.504 | 31.782 |
|---|---|---|---|
| Imaging distance | inf | inf | inf |
| D2 | 1.494 | 11.435 | 15.728 |
| D7 | 16.132 | 6.191 | 1.898 |
| D12 | 13.682 | 8.759 | 0.900 |
| D17 | 0.950 | 5.873 | 13.732 |
| BF | 0.600 | 0.600 | 0.600 |

(Variable interval (during focusing))

| | Wide angle end | Intermediate | Telephoto end |
|---|---|---|---|
| Imaging distance | 800 | 1000 | 1500 |
| D2 | 1.231 | 11.192 | 15.565 |
| D7 | 16.395 | 6.434 | 2.061 |

(Focal length of each lens group)

| Group | Surface number | Focal length |
|---|---|---|
| G1 | 1-2 | 154.765 |
| G2 | 3-7 | −13.039 |
| G3 | 8-12 | 52.695 |
| G4 | 13-17 | 19.532 |
| G5 | 18-26 | −92.514 |

(Aspherical surface data)

| Surface | k | A | B | C | D | E |
|---|---|---|---|---|---|---|
| 13 | 0.0000 | −1.8763E−05 | −3.4122E−08 | 1.5077E−09 | −1.3021E−11 | 0.0000E+00 |
| 14 | 0.0000 | 4.4057E−05 | −4.3664E−08 | 1.4976E−09 | −1.3700E−11 | 0.0000E+00 |

TABLE 1

|  | First embodiment | Second embodiment | Third embodiment | Fourth embodiment | Fifth embodiment | Sixth embodiment |
|---|---|---|---|---|---|---|
| (1) f4/fw | 2.13 | 2.76 | 2.18 | 1.81 | 2.11 | 1.73 |
| (2) f4p/f4 | 1.20 | 1.10 | 4.58 | 1.42 | 2.32 | 1.32 |
| (3) $\Delta$PgF_4p | 0.0145 | 0.0145 | 0.0145 | 0.0145 | 0.0145 | 0.0145 |
| (4) $\Delta$PCt_4p | −0.1211 | −0.1211 | −0.1211 | −0.1211 | −0.1211 | −0.1211 |
| (5) f3/fw | 5.83 | 4.07 | 4.94 | 9.80 | 5.59 | 4.68 |
| (6) nd3n | 1.91 | 1.59 | 1.85 | 1.88 | 1.86 | 1.90 |
| (7) vd3n | 35.25 | 35.45 | 23.78 | 40.80 | 30.00 | 31.31 |
| (8) vd4_ave | 68.66 | 75.40 | 68.66 | 65.60 | 62.17 | 65.60 |
| (9) f4/ft | 0.11 | 0.15 | 0.11 | 0.10 | 0.11 | 0.61 |
| (10) f4p/fw | 2.55 | 3.03 | 9.99 | 2.58 | 4.91 | 2.29 |
| (11) f4p/ft | 0.13 | 0.16 | 0.53 | 0.14 | 0.26 | 0.81 |
| (12) f3/f1 | 1.13 | 0.82 | 0.97 | 1.90 | 1.09 | 0.34 |
| (13) f3/f4 | 2.74 | 1.47 | 2.27 | 5.42 | 2.65 | 2.70 |
| (14) vd2p | 17.47 | 17.47 | 17.47 | 17.47 | 17.47 | 16.48 |

TABLE 2

|  | First embodiment | Second embodiment | Third embodiment | Fourth embodiment | Fifth embodiment | Sixth embodiment |
|---|---|---|---|---|---|---|
| fw | 14.300 | 14.311 | 14.308 | 14.300 | 14.305 | 11.261 |
| fm | 50.833 | 50.750 | 50.829 | 50.808 | 50.831 | 18.504 |
| ft | 271.989 | 271.972 | 272.028 | 271.979 | 271.986 | 31.782 |
| f1 | 74.110 | 71.261 | 72.926 | 73.759 | 73.109 | 154.765 |
| f2 | −14.973 | −14.376 | −14.966 | −15.489 | −15.051 | −13.039 |
| f3 | 83.395 | 58.200 | 70.743 | 140.140 | 80.031 | 52.695 |
| f4 | 30.456 | 39.466 | 31.195 | 25.873 | 30.206 | 19.532 |
| f5 | −23.846 | −27.222 | −22.495 | −19.752 | −21.905 | −92.514 |
| f6 | 43.016 | 50.427 | 41.765 | 39.030 | 40.686 | — |
| f4p | 36.423 | 43.415 | 142.874 | 36.853 | 70.213 | 25.751 |
| vd_4p1 | 55.71 | 55.71 | 55.71 | 55.71 | 55.71 | 55.71 |
| PgF_4p1 | 0.5622 | 0.5622 | 0.5622 | 0.5622 | 0.5622 | 0.5622 |
| $\Delta$PgF_4p1 | 0.0145 | 0.0145 | 0.0145 | 0.0145 | 0.0145 | 0.0145 |
| PCt_4p1 | 0.6867 | 0.6867 | 0.6867 | 0.6867 | 0.6867 | 0.6867 |
| $\Delta$PCt_4p1 | −0.1211 | −0.1211 | −0.1211 | −0.1211 | −0.1211 | −0.1211 | where in Table 2, f4p is the focal length of the positive lens closest to the object side in the fourth lens group in each embodiment, vd_4p1 is the Abbe number of the positive lens disposed closest to the object side among the positive lenses included in the fourth lens group, PgF_4p1 is the partial dispersion ratio for the g line and the F line of the positive lens disposed closest to the object side among the positive lenses included in the fourth lens group, $\Delta$PgF_4p1 is the extraordinary dispersion for the g line and the F line of the positive lens disposed closest to the object side among the positive lenses included in the fourth lens group, PCt_4p1 is the partial dispersion ratio for the C line and the t line of the positive lens disposed closest to the object side among the positive lenses included in the fourth lens group, $\Delta$PCt_4p1 is the extraordinary dispersion for the C line and the t line of the positive lens disposed closest to the object side among the positive lenses included in the fourth lens group, vd_4p2 is the Abbe number of the positive lens disposed at the second from the object side among the positive lenses included in the fourth lens group, PgF_4p2 is the partial dispersion ratio for the g line and the F line of the positive lens disposed at the second from the object side among the positive lenses included in the fourth lens group, $\Delta$PgF_4p2 is the extraordinary dispersion for the g line and the F line of the positive lens disposed at the second from the object side among the positive lenses included in the fourth lens group, PCt_4p2 is the partial dispersion ratio for the C line and the t line of the positive lens disclosed at the second from the object side among the positive lenses included in the fourth lens group, and $\Delta$PCt_4p2 is the extraordinary dispersion for the C line and the t line of the positive lens disposed at the second from the object side among the positive lenses included in the fourth lens group.

FIG. 21 illustrates an embodiment of an imaging device 100 according to the invention. The imaging device 100 illustrated in FIG. 21 includes a zoom lens 10 in the first embodiment and an image sensor 20 that converts an optical image, which is formed by the zoom lens 10, into an electric signal. The zoom lens is disposed inside a barrel 30 and the aperture stop S is held by the barrel 30. The barrel 30 is coupled to an imaging device main body 40 and the image sensor 20 is disposed inside the imaging device main body 40. However, the configuration of the imaging device according to the invention is not limited to the example illustrated in FIG. 21.

According to the invention, it is possible to provide the zoom lens and the imaging device capable of favorably correcting chromatic aberration to obtain high optical performance.

What is claimed is:

1. A zoom lens comprising, in order from an object side:
a first lens group having positive refractive power;
a second lens group having negative refractive power;
a third lens group having positive refractive power; and
a fourth lens group having positive refractive power,
wherein during zooming from a wide angle end to a telephoto end, at least the first lens group and the third lens group are fixed and an interval on an optical axis of an adjacent lens group relative thereto is changed,
the fourth lens group includes at least one positive lens P and satisfies conditional expression (1), conditional expression (2), conditional expression (3), and conditional expression (4) listed below:

$$1.5 \leq f4/fw \leq 4.5 \quad (1)$$

$$1.0 < f4p/f4 < 5.8 \quad (2)$$

$$0.01 \leq \Delta PgF\_4p \leq 0.05 \quad (3)$$

$$-0.2 \leq \Delta PCt\_4p \leq -0.03 \quad (4)$$

where
fw is a focal length of the zoom lens during infinity focusing at the wide angle end,
f4 is a focal length of the fourth lens group,
f4p is a focal length of the positive lens P,
$\Delta PgF\_4p$ is extraordinary dispersion for a g line and an F line of the positive lens P, and
$\Delta PCt\_4p$ is extraordinary dispersion for a C line and a t line of the positive lens P,
the at least one positive lens P is disposed closest to the object side in the fourth lens group, and
the third lens group satisfies following conditional expression:

$$4.0 \leq f3/fw \leq 12.0 \quad (5)$$

where
f3 is a focal length of the third lens group.

2. The zoom lens according to claim 1,
wherein the third lens group includes, in order from the object side, a positive lens and a negative lens, and further satisfies following conditional expressions:

$$1.5 \leq nd3n \quad (6)$$

$$vd3n \leq 50.0 \quad (7)$$

where
nd3n is a refractive index for a d line of the negative lens included in the third lens group, and
vd3n is an Abbe number for the d line of the negative lens included in the third lens group.

3. The zoom lens according to claim 1,
wherein the fourth lens group includes, in order from the object side, a positive lens and a doublet lens made up of a negative lens and a positive lens, and a positive lens disposed closest to the object side is a plastic lens.

4. The zoom lens according to claim 1,
wherein the zoom lens satisfies a following conditional expression:

$$55 \leq vd4\_ave \quad (8)$$

where
vd4_ave is an average value of Abbe numbers for a d line of all the positive lenses included in the fourth lens group.

5. The zoom lens according to claim 1,
wherein the zoom lens satisfies a following conditional expression:

$$0.05 \leq f4/ft \leq 1.0 \quad (9)$$

where
ft is a focal length of the zoom lens during infinity focusing at the telephoto end.

6. The zoom lens according to claim 1,
wherein the zoom lens satisfies a following conditional expression:

$$1.5 \leq f4p/fw \leq 12.0 \quad (10).$$

7. The zoom lens according to claim 1,
wherein the zoom lens satisfies a following conditional expression:

$$0.05 \leq f4p/ft \leq 1.1 \quad (11)$$

where
ft is a focal length of the zoom lens during infinity focusing at the telephoto end.

8. The zoom lens according to claim 1,
wherein the zoom lens satisfies a following conditional expression:

$$0.25 \leq f3/f1 \leq 2.2 \quad (12)$$

where
f1 is a focal length of the first lens group, and
f3 is a focal length of the third lens group.

9. The zoom lens according to claim 1,
wherein the zoom lens satisfies a following conditional expression:

$$1.2 \leq f3/f4 \leq 6.3 \quad (13)$$

where
f3 is a focal length of the third lens group.

10. The zoom lens according to claim 1,
wherein the second lens group includes, in order from the object side, a negative meniscus lens, a biconcave lens, and a positive lens, and satisfies a following conditional expression:

$$vd2p \leq 25 \quad (14)$$

where
vd2p is an Abbe number for a d line of the positive lens of the second lens group.

11. The zoom lens according to claim 1, further comprising:
a fifth lens group having negative refractive power on an image side of the fourth lens group.

12. The zoom lens according to claim 11,
wherein during focusing from infinity to near, the second lens group or the fifth lens group moves on the optical axis.

13. The zoom lens according to claim 1,
wherein an aperture stop is disposed between the second lens group and the fourth lens group and during zooming from the wide angle end to the telephoto end and during focusing from infinity to near, the aperture stop is fixed.

14. An imaging device comprising:
the zoom lens according to claim 1; and
an image sensor configured to convert an optical image, which is formed by the zoom lens, into an electric signal.

* * * * *